United States Patent
Li et al.

(10) Patent No.: US 10,298,466 B2
(45) Date of Patent: May 21, 2019

(54) SYSTEMS AND METHODS FOR SDT TO INTERWORK WITH NFV AND SDN

(71) Applicant: Huawei Technologies Co., Ltd., Shenzhen (CN)

(72) Inventors: Xu Li, Nepean (CA); Sophie Vrzic, Kanata (CA); Jaya Rao, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 411 days.

(21) Appl. No.: 15/002,090

(22) Filed: Jan. 20, 2016

(65) Prior Publication Data

US 2016/0212017 A1    Jul. 21, 2016

Related U.S. Application Data

(60) Provisional application No. 62/266,412, filed on Dec. 11, 2015, provisional application No. 62/119,620, (Continued)

(51) Int. Cl.
*H04L 12/24* (2006.01)
*H04L 29/08* (2006.01)

(52) U.S. Cl.
CPC .......... *H04L 41/20* (2013.01); *H04L 41/12* (2013.01); *H04L 41/5048* (2013.01); *H04L 67/18* (2013.01); *H04L 41/0896* (2013.01)

(58) Field of Classification Search
CPC ...... H04L 41/12; H04L 45/02; G06F 9/45533
See application file for complete search history.

(56) References Cited

U.S. PATENT DOCUMENTS 8,756,302 B2    6/2014   Cowan et al.
8,817,625 B1 *  8/2014   Zhang .................. H04Q 3/0029
                                                                370/235
(Continued)

FOREIGN PATENT DOCUMENTS

JP    2018503319 A    2/2018
WO   2014197778 A1   12/2014

OTHER PUBLICATIONS

Chen, Y. et al., "Translating Service Level Objectives to Lower Level Policies for Multi-Tier Services," Cluster Computing, 2008, 13 pages.

(Continued)

*Primary Examiner* — Christopher M Crutchfield
(74) *Attorney, Agent, or Firm* — Slater Matsil, LLP

(57) ABSTRACT

System and method embodiments are provided for enabling software defined topology (SDT) to interwork with network function virtualization (NFV) and software defined networking (SDN). In an embodiment, a method for software defined topology (SDT) management interworking with network function virtualization (NFV) and software defined networking (SDN) includes receiving, at an SDT Manager, from a service customer, a service request comprising a virtual service function forwarding graph (VSF FG); selecting a virtual network function (VNF) forwarding graph (FG) template in accordance with the received service request; generating a virtual function (VF) FG in accordance with the service request and the selected VNF FG template; selecting a point of presence (PoPs) for a VF in the VF FG; and transmitting, to an NFV Manager, instructions to instantiate the VF in accordance with at least one of the generated VF FG and the determined PoP.

23 Claims, 12 Drawing Sheets

Related U.S. Application Data filed on Feb. 23, 2015, provisional application No. 62/105,486, filed on Jan. 20, 2015.

(56) References Cited

U.S. PATENT DOCUMENTS

| | | | |
|---|---|---|---|
| 2011/0196940 | A1 | 8/2011 | Martinez et al. |
| 2013/0151646 | A1 | 6/2013 | Chidambaram et al. |
| 2014/0201374 | A1 | 7/2014 | Ashwood-Smith et al. |
| 2014/0310388 | A1 | 10/2014 | Djukic et al. |
| 2014/0362730 | A1 | 12/2014 | Zhang et al. |
| 2015/0052243 | A1* | 2/2015 | Lumezanu .............. H04L 43/04 709/224 |
| 2015/0063166 | A1 | 3/2015 | Sif et al. |
| 2015/0288767 | A1 | 10/2015 | Fargano et al. |
| 2016/0103698 | A1 | 4/2016 | Yang et al. |
| 2016/0182379 | A1 | 6/2016 | Mehra et al. |
| 2016/0197818 | A1* | 7/2016 | Stuart ..................... H04L 45/38 370/252 |
| 2016/0212016 | A1 | 7/2016 | Vrzic et al. |
| 2016/0335111 | A1 | 11/2016 | Bruun et al. |
| 2016/0373359 | A1* | 12/2016 | Bruun ..................... H04L 47/20 |
| 2017/0317872 | A1 | 11/2017 | Zhu |
| 2017/0329639 | A1 | 11/2017 | Morper et al. |
| 2018/0013617 | A1* | 1/2018 | Djukic ................. H04L 41/082 |

OTHER PUBLICATIONS

Clausen, J., "Branch and Bound Algorithms—Principles and Examples," Department of Computer Science, University of Copenhagen, Denmark, 1999. Internet resource: http://citeseerx.ist.psu.edu/viewdoc/summary?doi=10.1.1.5.7475, 30 pages.

Dolev, D. et al., "No Justified Complaints: On Fair Sharing of Multiple Resources," Proc. ITCS, 2012, 12 pages.

Halpern, J. et al., "Service Function Chaining (SFC) Architecture," IETF RFC 7665, Oct. 2015. https://tools.ietf.org/html/rfc7665, 32 pages.

Hawilo, H. et al., "NFV: State of the Art, Challenges and Implementation in Next Generation Mobile Networks (vEPC)," IEEE Network, vol. 28, No. 6, 2014, 11 pages.

Hu, F. et al., "A Survey on Software-Defined Network and OpenFlow: From Concept to Implementation," IEEE Communications Surveys & Tutorials, vol. 16, No. 4, Fourth Quarter, 2014, 26 pages.

Open Platform for NFV, downloaded from https://www.opnfv.org/software/technical-overview, Jan. 20, 2016, 3 pages.

Sezer, S. et al., "Are We Ready for SDN?—Implementation Challenges for Software-Defined Networks," IEEE Communications Magazine, vol. 51, No. 7, 2013, 13 pages.

Stillwell, M. et al., "Virtual Machine Resource Allocation for Service Hosting on Heterogeneous Distributed Platforms," Proc. IEEE IPDPS, 2012, 12 pages.

Tullberg, H. et al., "METIS System Concept: The Shape of 5G to Come," IEEE Communications Magazine, 2015, 13 pages.

Wood, T. et al., "Profiling and Modeling Resource Usage of Virtualized Applications," Proc. ACM/IFIP/USENIX Middleware, 2008, 20 pages.

Zhang, H. et al., "5G Wireless Network: MyNet and SONAC," IEEE Network, Jul./Aug. 2015, 10 pages.

"Network Functions Virtualisation (NFV); Management and Orchestration," ETSI GS NFV-MAN 001, V1.1.1, Group Specification, Dec. 2014, 184 pages.

"SDN Controlled VNF Forwarding Graph," (PoC Project Name), NFV ISG PoC Proposal A.1 NFV ISG PoC Proposal 4.1.1 PoC Team Members ; NFV ( 14 ) 000238r4_PoC_Proposal _SDN_ Controlled VNF Forwarding_Graph, ETSI NFV IDS POC Proposal, XP 14219347, Nov. 2014, 10 pages.

Francois, F. et al., "Leveraging MPLS Backup Paths for Distributed Energy-Aware Traffic Engineering," IEEE Transactions on Network and Service Management, Jun. 2014, 15 pages.

Hoang, D.H. et al., "A Proactive Concept for QoS Supports in Wireless Networks," retrieved from the internet on Nov. 17, 2016, http://citeseerx.ist.psu.edu/viewdoc/summary?doi=10.1.1.12.8058, 2001, 10 pages.

Mangili, M. et al., "Concise Paper: Stochastic Planning for Content Delivery: Unveiling the Benefits of Network Functions Virtualization," 22nd IEEE International Conference on Network Protocols, ICNP, Oct. 21-24, 2014, 6 pages.

Seetharaman, S., "OpenFlow/Software-Defined Networking," Deutsche Telekom Innovation Center, Nov. 2011, 41 pages.

Shen, W. et al., "vConductor: An NFV Management Solution for Realizing End-to-End Virtual Network Services," IEICE—Asia-Pacific Network Operation and Management Symposium (APNOMS), 2014, 6 pages.

Zaalouk, A. et al., "Network Configuration in OpenFlow Networks," 6th International Conference on Mobile Networks and Management, 2014, 14 pages.

ETSI GS NFV-SWA 001 V1.1.1, Network Functions Virtualisation (NFV); Virtual Network Functions Architecture, Dec. 2014, 93 pages.

\* cited by examiner

900

PROBLEM 1 (ORDERED CHAINING):

$$\min_{x \geq 0; y, z \in \{0,1\}} C(x, y, z) + \sum_{e \in E}(1 - y_e) + \sum_{l \in L}(1 - z_l)$$

s.t.

$$\sum_{a \in A: a_{src}=d} x_a = \gamma_{d'} \qquad \forall d \in D \quad (1) \left.\begin{array}{l}\\\\\\\\\\\\\\\end{array}\right\}$$

$$\sum_{s \in S}\sum_{a \in A: a_{dst}=s} x_a = \gamma \qquad (2)$$

$$\sum_{a \in A: a_{src}=e} x_a = P_e \sum_{a \in A: a_{dst}=e} x_a, \quad \forall e \in E \quad (3) \quad \text{NETWORK CONSTRAINTS}$$

$$x_a \leq \beta_a, \qquad \forall a \in A \quad (4)$$

$$\boxed{x_a = x'_a, \forall a \in A : a_{dst} = e, \qquad \forall e \in E \quad (5)} \quad \text{COUPLING CONSTRAINTS}$$

$$\sum_{a \in A: a_{dst}=e} x'_a = r_e^+, \qquad \forall e \in E \quad (6) \left.\begin{array}{l}\\\\\\\\\\\\\\\end{array}\right\}$$

$$\sum_{e \in E: e_{loc}=l}\sum_{a \in A: a_{dst}=e} x'_a = r_l^+, \qquad \forall l \in L \quad (7)$$

$$\Psi(\{r_e^+ | e \in E, e_{loc} = l\}) \leq \psi_l, \qquad \forall l \in L \quad (8) \quad \text{NFV}$$

$$y_e \leq r_e^+, \qquad \forall e \in E \quad (9)$$

$$z_l \leq r_l^+, \qquad \forall l \in L \quad (10)$$

FIG. 9

SYSTEMS AND METHODS FOR SDT TO INTERWORK WITH NFV AND SDN

This application claims the benefit of U.S. Provisional Application No. 62/119,620, filed on Feb. 23, 2015, titled "Method and Apparatus for NFV Management and Orchestration," of U.S. Provisional Application No. 62/105,486, filed Jan. 20, 2015, titled "Systems and Methods for SDT to Interwork with NFV and SDN," and of U.S. Provisional Application No. 62/266,412, filed on Dec. 11, 2015, titled "Systems and Methods for SDT to Interwork with NFV and SDN," which are hereby incorporated by reference.

TECHNICAL FIELD

The present invention relates to systems and methods for enabling the use of software defined topology (SDT), and, in particular embodiments, to systems and methods for SDT to interwork with Network Function Virtualization (NFV) and Software Defined Networking (SDN).

BACKGROUND

In conventional communication networks, a topology is defined by the location of nodes and the links that interconnect them. As nodes and functions are virtualized, and as logical links can be created between virtualized nodes, the topology of a network, which was once defined solely by the arrangement of physical resources, can be defined by network management entities. Software Defined Topology (SDT), along with other technologies such as Software Defined Networking (SDN), is considered as an enabling technology for the dynamic creation and management of networks. In the context of a next generation network, such as a so-called fifth generation (5G) wireless networks, an SDT management entity can be employed to generate/determine a network logical topology for each service, including (1) virtual function points of presence (PoP) decision, i.e., physical locations (network addresses) of virtual functions, and (2) logical link decisions, i.e., logical links between service traffic sources, service VF PoPs, and service traffic destinations, and respective resource requirements.

SUMMARY

An embodiment method for software defined topology (SDT) management interworking with network function virtualization (NFV) and software defined networking (SDN) includes receiving, at an SDT Manager, from a service customer, a service request comprising a virtual service function forwarding graph (VSF FG); selecting a virtual network function (VNF) forwarding graph (FG) template in accordance with the received service request; generating a virtual function (VF) FG in accordance with the service request and the selected VNF FG template; selecting a point of presence (PoPs) for a VF in the VF FG; and transmitting, to an NFV Manager, instructions to instantiate the VF in accordance with at least one of the generated VF FG and the determined PoP.

An embodiment software defined topology (SDT) manager includes a processor and a non-transitory computer readable storage medium storing programming for execution by the processor, the programming including instructions to: receive, from a service customer, a service request comprising a virtual service function forwarding graph (VSF FG); select a virtual network function (VNF) forwarding graph (FG) template in accordance with the received service request; generate a virtual function (VF) FG in accordance with the service request and the selected VNF FG template; select a points of presence (PoPs) for a VF in the VF FG; and transmit, to an NFV Manager, instructions to instantiate the VF in accordance with at least one of the generated VF FG and the determined PoP.

An embodiment a network controller includes a software defined topology (SDT) component comprising a processor and non-transitory computer readable media and an interface, wherein the SDT component includes: a template selector, a virtual function (VF) forwarding graph (FG) generator that generates a VF FG according to at least one virtual network function (VNF) forwarding graph (FG) template selected by the template selector, a service request from a customer, traffic information, and NFVI information, the service request comprising a virtual service function forwarding graph (VSF FG); and a points of presence (PoP) and logical links (LL) generator that determines VF PoP information and determines LL information for LLs between service traffic sources, service traffic sinks, and VN PoPs according to the VF FG, the service request, the traffic information, and the NFVI information, and wherein the interface provides at least one of the VF FG, the PoP information, and the LL information to at least one of a NFV-management and organization (MANO) component and a software defined networking (SDN) traffic engineering (TE) component.

BRIEF DESCRIPTION OF THE DRAWINGS

For a more complete understanding of the present invention, and the advantages thereof, reference is now made to the following descriptions taken in conjunction with the accompanying drawing, in which:

FIG. 9 illustrates a singular service case embodiment;

DETAILED DESCRIPTION OF ILLUSTRATIVE EMBODIMENTS

Figure 1:
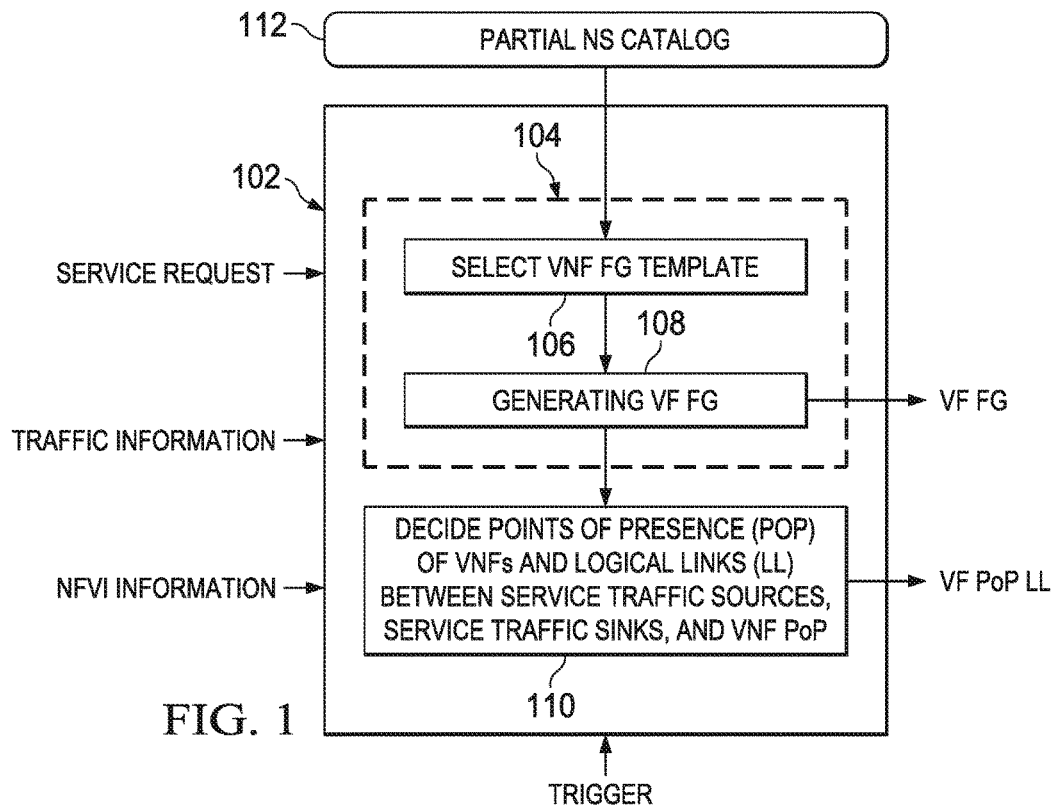
FIG. 1 illustrates an embodiment of a software defined topology (SDT)

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Because parts of SDT functionality are required by European Telecommunications Standards Institute (ETSI) Network Function Virtualization (NFV), there is a need to define how SDT interworks with the NFV-MANagement and Orchestration (MANO) framework to enhance the NFV-MANO framework.

Embodiment systems and methods enable SDT to interwork with NFV and SDN. Various embodiments include new input to SDT/NFV, four interworking options, and interfacing/interaction between SDT, NFV and SDN components. An embodiment SDT problem formulation and solution including distributed SDT implementation.

An embodiment allows interoperability of SDT with NFV and SDN architectures. An embodiment enables distributed SDT implementation. An embodiment separates NFV infrastructure (NFVI) (e.g. data center) resource management from network management. An embodiment reduces management complexity, computational complexity, and control signaling overhead. An embodiment enables management flexibility, and local reaction/adjustment.

In an embodiment, a method for software defined topology (SDT) management interworking with network function virtualization (NFV) and software defined networking (SDN) includes receiving a service request containing a virtual service function (VSF) forwarding graph (FG); selecting at least one virtual network function (VNF) FG template; generating a VF FG in accordance with the service request and the selected at least one VNF FG template; determining points of presence (PoPs) of VFs in the VF FG; and providing the VF FG and PoP information for VNF instantiation and logical link provisioning.

In an embodiment, a software defined topology (SDT) manager includes a processor; and a non-transitory computer readable storage medium storing programming for execution by the processor, the programming including instructions for: receiving a service request containing a VSF FG; selecting at least one virtual network function (VNF) forwarding graph (FG) template; generating a VF FG in accordance with the service request and the selected at least one VNF FG template; determining points of presence (PoPs) of VFs in the VF FG; and providing the VF FG and PoP information for VNF instantiation and logical link provisioning.

In the ETSI NFV architecture, it is assumed that the orchestrator has access to the following data repositories: network services catalog, VNF catalog, NFV instances, and NFVI resources. The network services catalog is a repository of all the on-boarded network services. It includes network services descriptor (NSD), virtual link descriptor (VLD), and VNF forwarding graph descriptor (VNFFGD). The VLD describes the resource requirements that are needed for a link between VNFs, physical network functions (PNF) and endpoints. The VNFFGD contains a network forwarding path (NFP) element which contains an ordered list of connections points along with the rules/policies associated to the list.

The VNF catalog is a repository of all the on-boarded VNF packages. It includes software images and VNF descriptor (VNFD), which describes the VNF in terms of its deployment and operational behavior, and is used by the VNFM to instantiate the VNF and lifecycle management of the VNF.

The NFV instances repository holds information of all VNF instances and network service instances; each VNF instance is represented by a VNF record and each NS instance is represented by an NS record.

The NFVI resources repository holds information about the available/reserved/allocated NFVI resources as abstracted by the VIM across the operator's infrastructure domains. It is used for resource reservation, allocation and monitoring.

Within the ETSI NFV framework, the orchestrator determines the FG from the NS catalog. The FG defines the logical topology for the requested network service. Currently, it is assumed that the VNFFGs are developed by service providers or by their systems integration partners. Service providers can use a template of typical network services to define customized network services. However, this is done manually.

With respect to SDT, VNF is differentiated from VSF, and the ETSI NFV framework is extended to deal with generic VF including both VNF and VSF; instead of manually defining the logical topology for a network service, the logical topology can be automatically created from the network service request. This automated approach to defining the logical topology is referred to as software defined topology (SDT). The role of SDT is to determine the VF FG (which defines the function chaining requirement), determine the forwarding paths (e.g., for the control plane and data plane), and determine the PoP for each function in the VF FG (which defines the logical topology), including the number of instances of each function in the FG. The SDT entity can also be referred to as a topology manager. SDT can be combined with NFV, in which case, SDT can also be a virtual function that is instantiated by the NFV-MANO. If SDN is also used to split the control plain and the data plane then there should be a defined interface between the SDN controller and SDT. Because SDT provides the logical topology for the NS request to the orchestrator, there should be a defined interface between SDT and the orchestrator. After SDT's decision making, NFV and SDN are used to provision resultant service-specific network topologies. NFV is used to instantiate service functions, while SDN is used to provision the physical connections under-laying the logical connections.

Virtual functions distinguish customer-specific service functions (VSF) and general networking functions (VNF). VSF are defined by service customers reflecting service business logic, and may or may not be known to the network operator. VNF are used for empowering the networking process. They are offered by, and thus known, to the network operator.

The network system maintains a partial network service catalog including typical VNF forwarding graph (VNF FG) templates. Customers do not need to know or maintain it. It is possible that a VNF FG contains a single VNF.

The VF FG of a service is a combination of a VNF FG and a VSF FG. It is possible that a VF FG is the same as a VNF FG or a VSF FG. It will also be understood by those skilled in the art that the VFs in any of the FGs may be present without a specified order.

FIG. 1 illustrates an embodiment of a software defined topology (SDT) 102. SDT 102 may also be referred to as an SDT manager or a management entity. The SDT 102 includes a VF FG generating component 104 and a VF PoP Logical Link (LL) generating component 110. The component 104 includes a template selection component 106 and a VF FG generator 108. The template selection component 106 receives at least a partial NS catalog 112 from, for example, the network operator. In an embodiment, the NS catalog 112 may be partial because it may contain only VNF FG, but may be missing the VSF FG part which, in an embodiment, is supplied by the customer. In other embodiments, the NS catalog 112 may contain both the VNF FG and the VSF FG. The template selection component 106 selects a VNF FG template and provides it to the VF FG generator 108. The VF FG generator 108 generates a VF FG. The VF PoP LL generating component 110 decides points of presence (PoP) of VNFs and logical links (LL) between service traffic sources, service traffic sinks, and VF PoP and outputs a VF PoP LL.

In the service request, the service customer may provide a partial VF FG (e.g. VSF FG) or a complete VF FG.

In the service request, the service customer may provide a VSF FG that contains traffic sources and traffic destinations as special VSF.

In the service request, the service customer may provide a VSF FG that contains only traffic sources and traffic destinations.

Input to SDT 102 includes a service request, including service traffic description: traffic source distribution, traffic source mobility, traffic characteristics, etc., and service function description: VSF FG (or service function chains), function characteristics, etc. The service function description includes stateless function or stateful function; function overhead on storage, CPU, memory, I/O access, traffic rate; and function instantiation constraints: e.g., min/max number of PoPs, preferred-/non-preferred PoPs, optional or not, dependency on the instantiation of another VF, recursive as separate VF or not and a maximum/minimum number of recursions The service request further includes service traffic quality requirements, such as traffic QoS requirements, service user QoE requirements, and service function quality requirements: effectiveness, efficiency, etc. The function effectiveness is e.g., prob. of event detection, or prob. of false alarm. The function efficiency is, e.g., reporting-response delay.

The input to SDT 102 further includes traffic information, including statistical loading per physical link, per node, per logical link, which, e.g., may be obtained from data analytics.

The input to SDT 102 further includes NFVI information, such as PoP locations, per-PoP function availability, per-PoP processing load bounds, etc., and statistical load, delay, capacity between devices, BSs, routers, and NFVI PoPs, and nominal remaining network resources (physical link capacities, radio resources, etc.).

The input to SDT 102 further includes triggers indicating, e.g., change in service, network, and/or NFVI PoP information, a human trigger, a timeout event, or a performance trigger (service, SDT, TE).

The input to SDT 102 further includes partial network service (NS) catalog, such as typical VNF FG templates.

SDT 102 relies on per-VNF policies/constraints, each of which regulates the insertion of a VNF into the VSF FG for generating VF FG. The policies are pre-defined, and may be updated on demand. They can be stored in the NS catalog.

The per-VNF policies/constraints are generally classified as service-type-dependent constraints, connectivity constraints, ordering constraints, resource-/loading-aware constraints, monitoring-function-specific constraints.

A service-type-dependent constraint limits a VNF to be or not to be selected/used for a particular type of service. For example, a virtual MME function is applicable only to mobile services.

A connectivity constraint defines the logical connectivity and the properties (such as whether it is direct connection, co-location preference, direction, etc.) of the connectivity of a first VNF with a second VNF. It may force both VNFs to be used/selected in the resultant VF FG. For example, when traffic engineering is engaged in the network, a connectivity constraint is defined for a virtual MME function and a virtual TE function; if the virtual MME function is selected due to the fact the service is a mobile service, the virtual TE function is selected automatically and a logical link is created between them according to this constraint. Connectivity constraints may be expressed part of a VNF FG template; they may also be defined between VNF and VSF.

An ordering constraint specifies the appearance order of a VNF with respect to the other virtual functions along a function chain in the resultant VF FG. For example, a virtual serving gateway function must appear between a virtual eNodeB function and a virtual packet gateway function. It will be understood by those skilled in the art that in some embodiments the ordering constraint may either be absent, or it may specify that for a set of VFs in a function chain the ordering of the VFs is immaterial.

A resource-/load-aware constraint defines the selection and placement of a VNF to be subject to PoP resource load and/or traffic load. For example, a load balancing function can only be inserted at a place where traffic has the choice to be forwarded to one of the multiple PoPs of the same next-hop function in the VF FG.

A monitoring function constraint defines the selection and placement constraint for a virtual monitoring VNF. The VNF should be used and placed at the proper places complying with the monitoring purpose and requirements. For example, a charging-oriented monitoring function is to be inserted at the proper locations (and logical links are created for it) such that the usage information about the chargeable resources (such as CPU, storage, bandwidth) can be collected.

Figure 2:
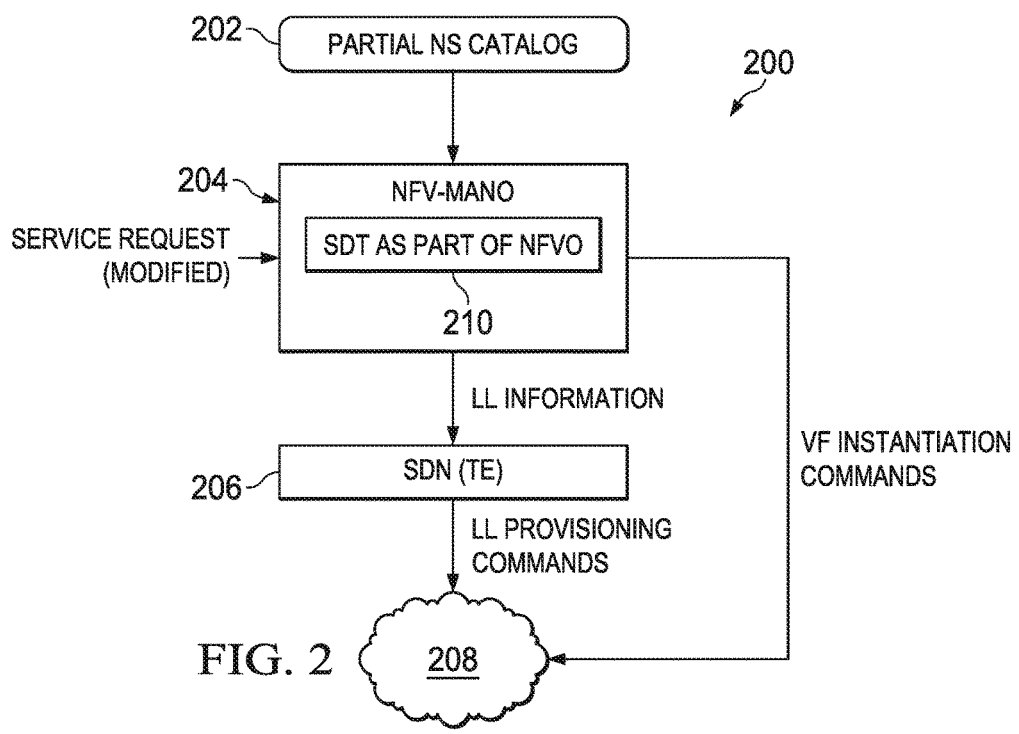
FIG. 2 illustrates an embodiment of a system of an SDT inside European Telecommunications Standards Institute (ETSI) network function virtualization (NFV)-Management and Organization (MANO), and in particular as part of NFV Orchestrator (NFVO)

FIG. 2 illustrates an embodiment of a system 200 of an SDT 210 inside an ETSI NFV-MANO compliant controller 204, and in particular as part of an NFV Orchestrator (NFVO). The NFV-MANO 204 component receives service request and reads the NS catalog 202 for VNF FG templates; it re-directs the data to the inside SDT component 210, which make decisions on VF FG, VF PoP and logical links (LL). The NFV-MANO 204 is coupled to a SDN (TE) 206 and provides LL information (inter-node) to the SDN (TE). The SDN (TE) 206 determines and provides LL provisioning commands to the network 208. The NFV-MANO 204 also provides VF instantiation commands to the network 208.

Figure 3:
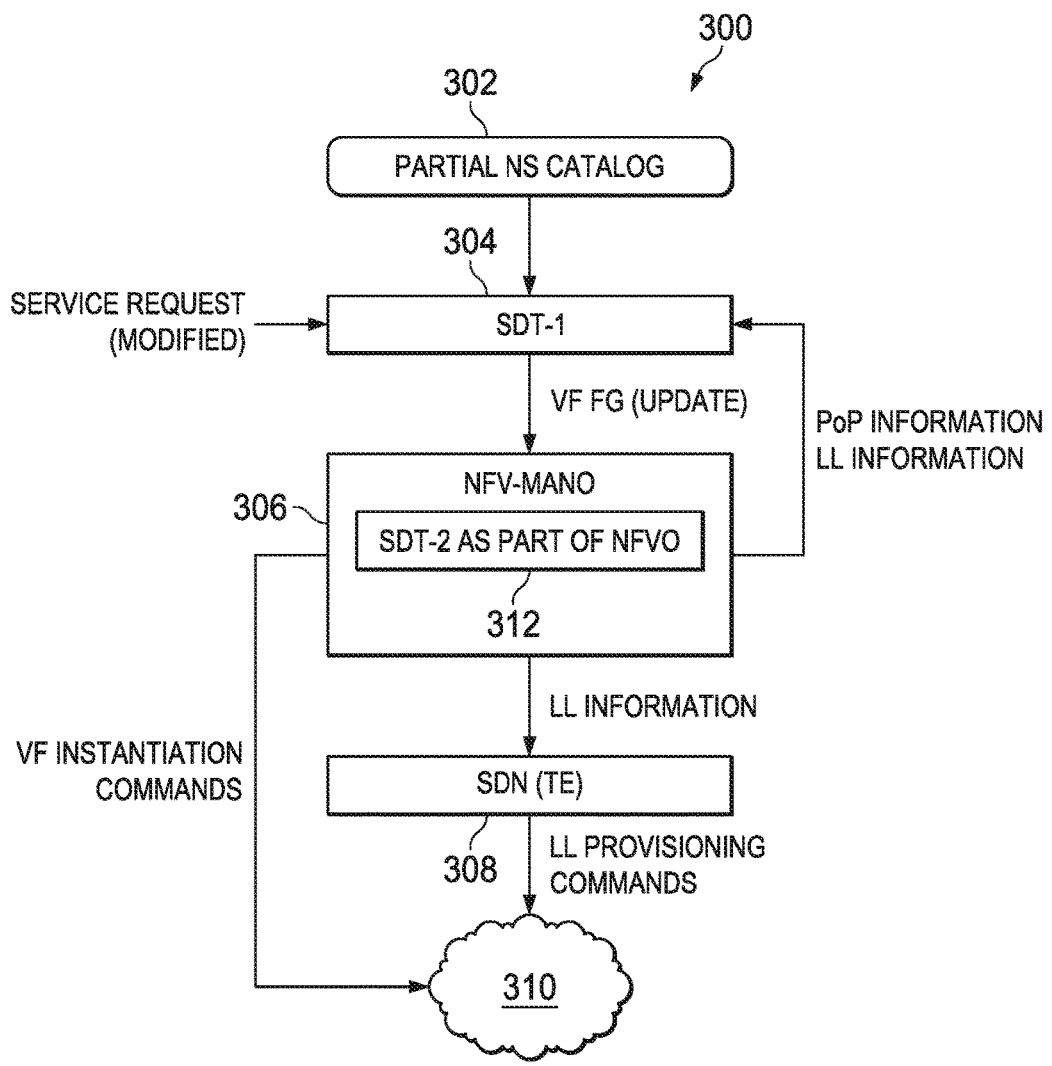
FIG. 3 illustrates a first embodiment of a system with an SDT outside ETSI NFV-MANO.

FIG. 3 illustrates a first embodiment of a system 300 with an SDT outside ETSI NFV-MANO. System 300 includes a partial NS catalog 302, an SDT-1 304, an NFV-MANO 306 that includes an SDT-2 312, an SDN (TE) 308, and a network 310. SDT-1 304 is a VF FG generator; and SDT-2 312 determines VF PoP and LL. The SDT-1 304 components receives service request and reads the NS catalog 302 for VNF FG templates and computes an initial VF FG and inputs it to the NFV-MANO component 306, which determines VF PoP and LL and feeds back its decision to the SDT-1 304. Upon the feedback, SDT-1 304 adjusts its VF FG decision and updates it to NFV-MANO 306. The above steps are iteratively repeated until SDT-1 304 finds that no new VNFs need to be added to the VF FG or no changes need to be made to the logical connection among the VF in the VF FG and informs the NFV-MANO 306 that its decision is final (i.e. no feedback needed).

Figure 4:
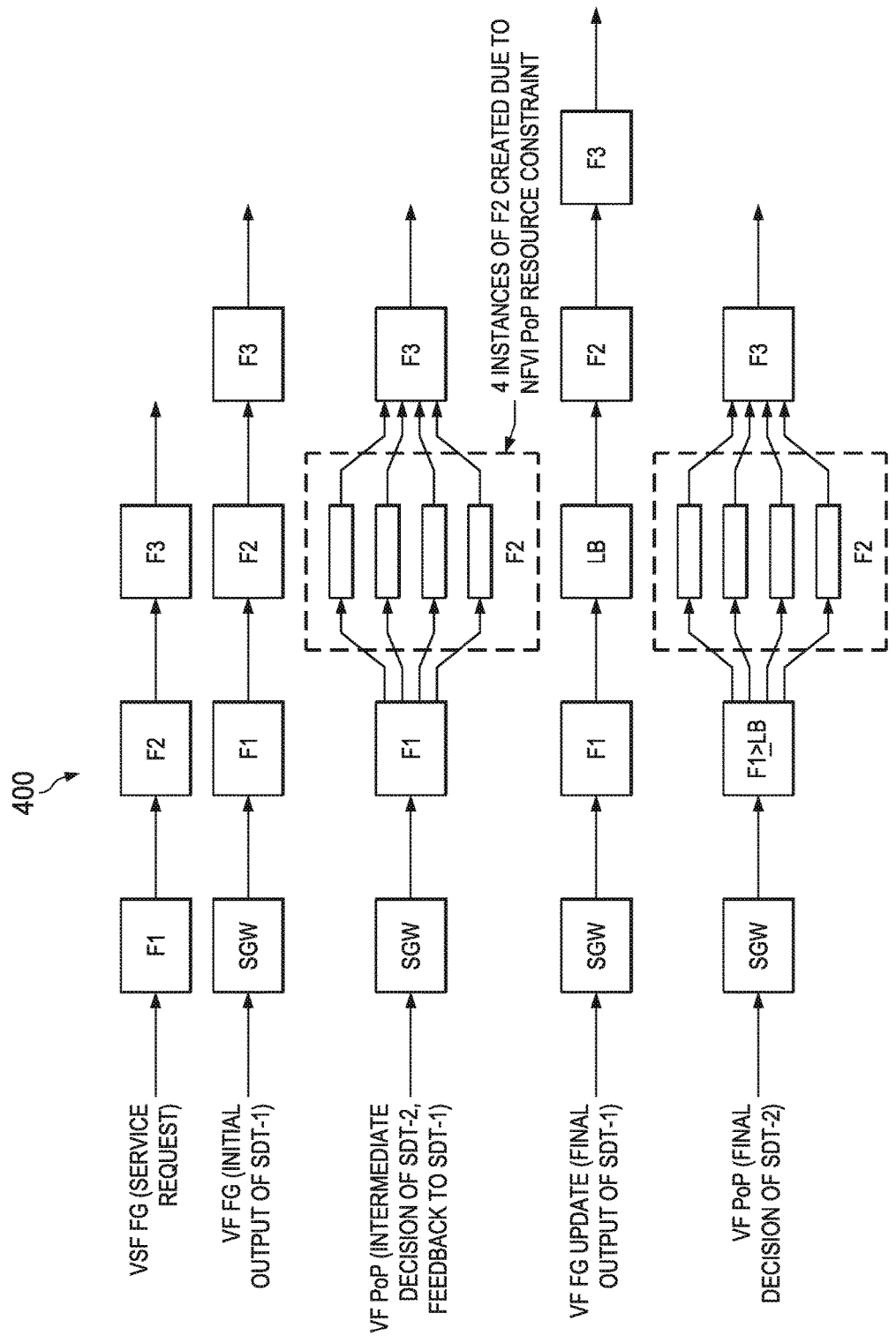
FIG. 4 illustrates an embodiment of a system with SDT outside ETSI NFV-MANO.

FIG. 4 illustrates an embodiment of a system 400 with SDT outside ETSI NFV-MANO. Function F2 is a stateless function (which is featured with the absence of any context information). An SDT controller can add a load balancing (LB) function into the VF FG after seeing the multiple instances of F2.

Figure 5:
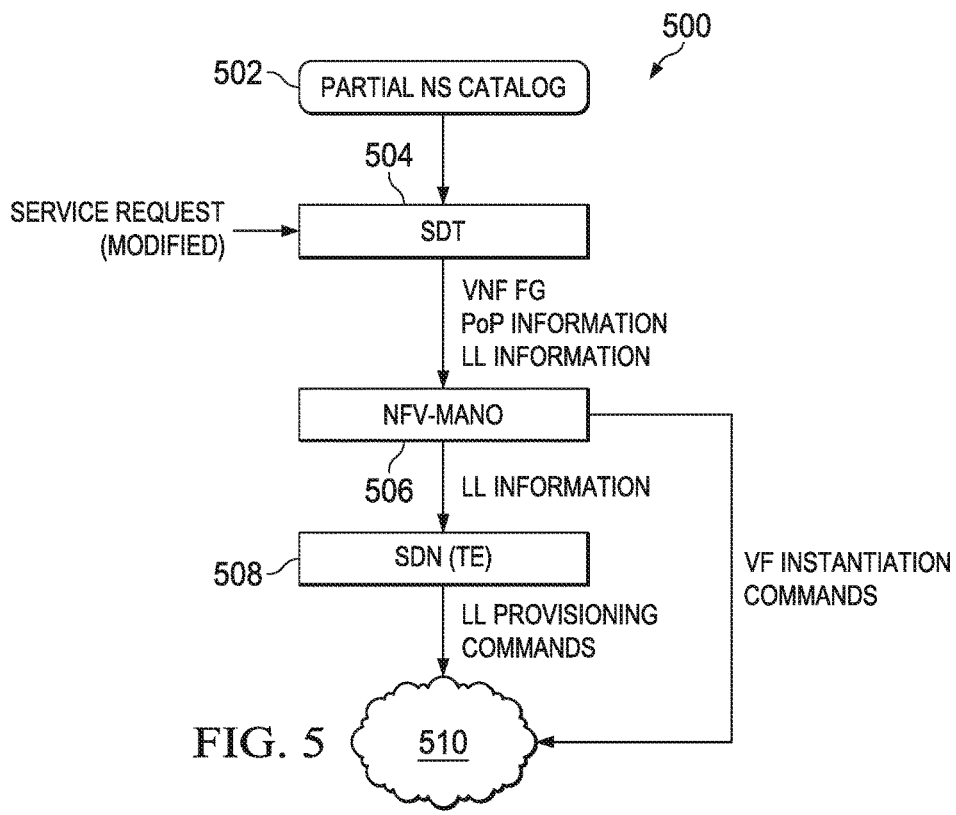
FIG. 5 illustrates a second embodiment of a system with an SDT outside ETSI NFV-MANO.

FIG. 5 illustrates a second embodiment of a system 500 with an SDT outside ETSI NFV-MANO. SDT fulfills the NFVO functionality of defining logical topology. System 500 includes a partial NS catalog 502, an SDT 504, an NFV-MANO component 506, an SDN (TE) 508, and a network 510. The SDT component 504 is completely outside the NFV-MANO 506 (as opposed to the case in FIG. 3 where it is split into two sub-components, one outside the NFV-MANO and the other inside). The SDT component 504 takes the full SDT decision (i.e. in addition to defining VF FG, fulfilling the NFVO functionality of defining logical topology including VNF PoP and LL) and inputs the decision to the NFV-MANO 506; the latter accepts the decision to instantiate the VFs and provision the network via the SDN (traffic engineering (TE)) component 508.

Figure 6:
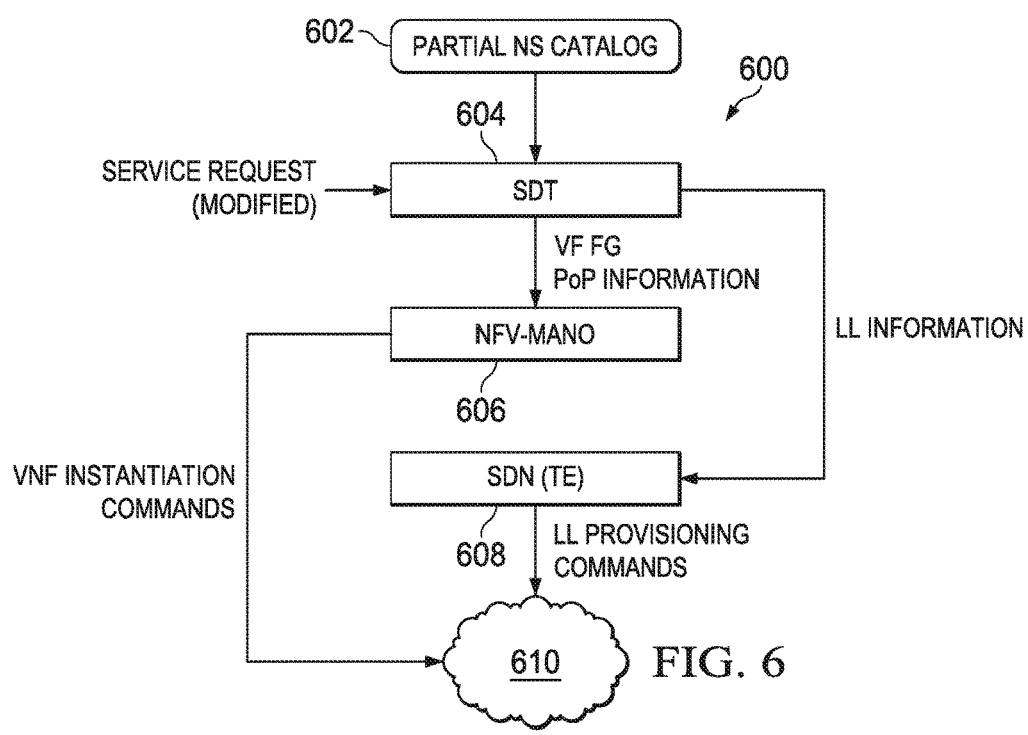
FIG. 6 illustrates a third embodiment of a system with an SDT outside ETSI NFV-MANO.

FIG. 6 illustrates a third embodiment of a system 600 with an SDT outside ETSI NFV-MANO. System 600 includes a partial NS catalog 602, an SDT component 604, an NFV-MANO component 606, an SDN (TE) component 608, and a network 610. SDT component 604 determines VF FG and fulfills the NFVO functionality of defining logical topology and directly informs (logical link) LL information to SDN (as opposed to going through the NFV-MANO component 606, as indicated in FIG. 5).

Figure 7:
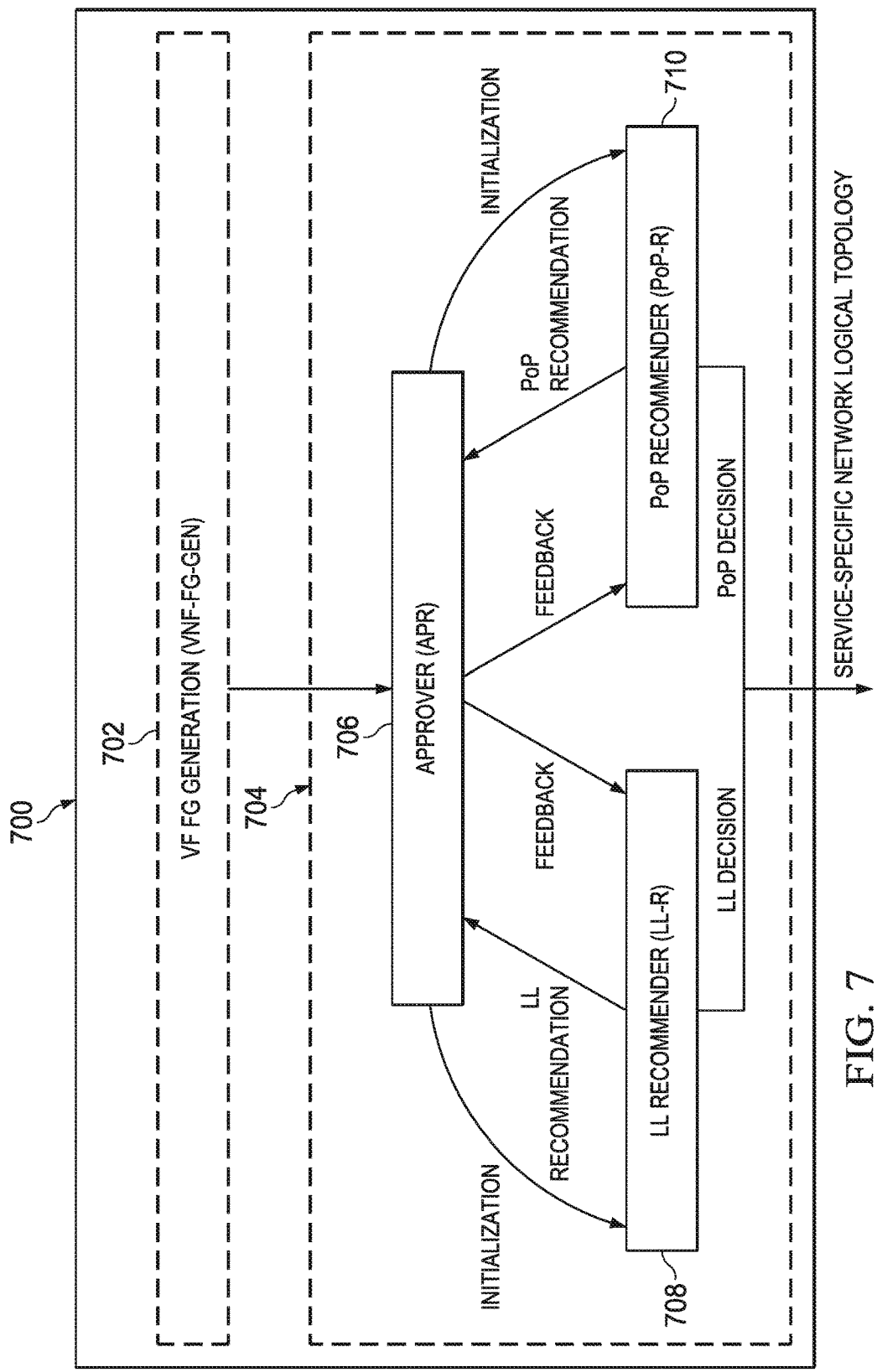
FIG. 7 illustrates an embodiment of an SDT internal process, and in particular a distributed implementation embodiment.

FIG. 7 illustrates an embodiment of an SDT 700 internal process, and in particular a distributed implementation embodiment. The SDT 700 includes a VF FG GEN component 702 and a SDT-2 component 704. The VF-FG-GEN component 702 (corresponds to the SDT-1 304 component in FIG. 3) generates VF FG based on service request, NS catalog and other necessary input information and inputs it to the SDT-2 component 704, which makes decisions on VF PoP and LL. This SDT-2 component 704 can be implemented through three sub modules, i.e. APR 706, LL-R 708, and PoP-R 710. The APR 706 receives VNF FG and initializes PoP-R and LL-R. PoP-R 710 and the LL-R 708 respectively recommend VNF PoP and LL to the APR 706. The APR 706 provides feedback to the PoP-R 710 and LL-R 708 for their recommendation or to approve their recommendation. In an embodiment, for each unique VF, PoP pair, the feedback can be described as cost or price of instantiating the VF at the PoP. For each logical link, the feedback can be described as unit cost of transmitting data over the logical link. In an embodiment, the feedback includes the dual variable values $\lambda$ according to the embodiment described in the first embodiment algorithm below. According to the feedback, PoP-R 710 and LL-R 708 revise their recommendations. This recommendation-feedback process proceeds iteratively until the APR 706 approves the recommendations (i.e. the feedback indicates an approval message) when some criteria are satisfied. Upon approval, the PoP-R 710 and LL-R 708 output their results, which constitute the final SDT 700 solution.

Figure 8:
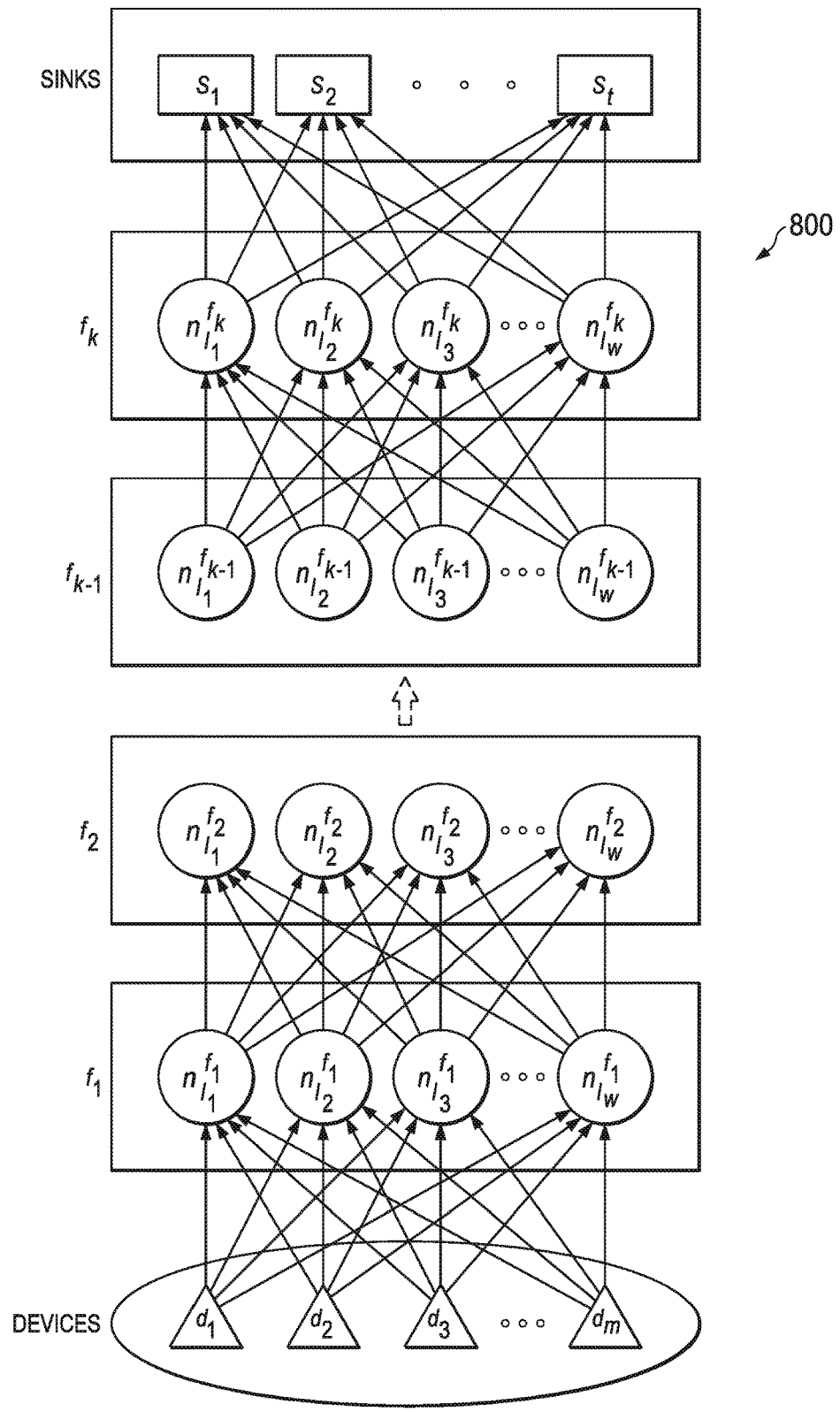
FIG. 8 illustrates an augmented forwarding graph (AFG), where each virtual function $f$ is augmented with PoP candidate locations indicated as round nodes, and in particular an example of ordered function chaining.

FIG. 8 illustrates an augmented forwarding graph (AFG) 800, where each virtual function $f$ is augmented with PoP candidate locations indicated as round nodes, and in particular an example of ordered function chaining.

FIG. 9 illustrates a singular service case embodiment 900.

TABLE I

KEY DENOTATIONS

| | |
|---|---|
| G(N, A) | AFG graph with node set N and arc set A |
| F | function set $\{f_1, f_2, \ldots, f_k\}$ |
| L | function location set $\{l_1, l_2, \ldots, l_w\}$ |
| D | source node set $\{d_1, d_2, \ldots, d_m\}$ |
| S | sink node set $\{s_1, s_2, \ldots, s_t\}$ |
| E | Eta node set $\{e|e = \eta_l^f, \forall f \in F, \forall l \in L\}$ |
| $\alpha_a$ | cost of link $a \in A$ |
| $\beta_a$ | capacity of link $a \in A$ |
| $\rho_f$ | traffic reduction factor of function f |
| $\rho_e$ | traffic reduction factor of eta node e |
| $\varphi_l$ | processing load upper bound at location l |
| $\gamma_d$ | traffic rate of source d |
| $\gamma$ | expected total reception rate at S, i.e, $\gamma = (\Sigma_{d \in D} \gamma_d) \Pi_{f \in F} \rho_f$ |
| $r_a^d$ | rate allocation over link a for the traffic originated from device d |
| $r_e^{d+}$ | in-coming rate to eta node e for the traffic originated from device d |
| $r_e^+$ | total incoming rate to eta node e |
| $r_l^+$ | total incoming rate to location l |
| $x_a$ | total rate allocation over link a |
| $y_e$ | binary indicator of non-zero incoming rate to eta node e |
| $z_l$ | binary indicator of non-zero incoming rate to location l |

Network cost is defined as, for example:

$$C^{(N)}(x) = \sum_{a=A} \alpha_a x_a.$$

Distributed DC cost is defined as, for example:

$$C^{(O)}(y, z) = \sum_{l \in L} \left( \omega^{(F)} \sum_{e \in E: e_{loc} = 1} y_e + \omega^{(L)} z_l \right).$$

Let $\omega^{(F)}$ be the weighting factor of network cost. The total cost is given as:

$$C(x, y, z) = \omega^{(N)} C^{(N)}(x) + (1 - \omega^{(N)}) C^{(O)}(y, z).$$

Problem decomposition (over the coupling constraints) illustrating a first embodiment algorithm:

The partial Lagrangian of Problem 1 is expressed as separable functions as follows:

$$\Lambda(x, y, z, \lambda) = \Lambda^{(N)}(x, \lambda) + \Lambda^{(O)}(x', y, z, \lambda)$$

where $$\Lambda^{(N)}(x, \lambda) = C^{(N)}(x) + \sum_{a \in A} \lambda_a x_a$$

is the network cost function and $$\Lambda^{(O)}(x', y, z, \lambda) = C^{(O)}(y, z) \sum_{e \in E} (1 - y_e) + \sum_{l \in L} (l - z_l) - \sum_{e \in E} \sum_{a \in A: a_{dst}=e} \lambda_a x'_a$$

is the DC cost function

The dual of Problem 1 is given by:

$$D(\lambda) = D_1(\lambda) + D_2(\lambda) = \inf_x \{\Lambda^{(N)}(x, \lambda)\} + \inf_{x',y,z} \{\Lambda^{(O)}(x', y, z, \lambda)\}$$

From the dual objective, the dual problem is formulated as:

P2: $\max_{\lambda > 0} D(\lambda)$

The sub-problems of the dual are given by:

P2.1: $\min_x \Lambda^{(N)}(x, \lambda)$

An SDN problem

P2.2: $\min_{x',y,z} \Lambda^{(O)}(x', y, z, \lambda)$

An NFV problem

Figure 10:
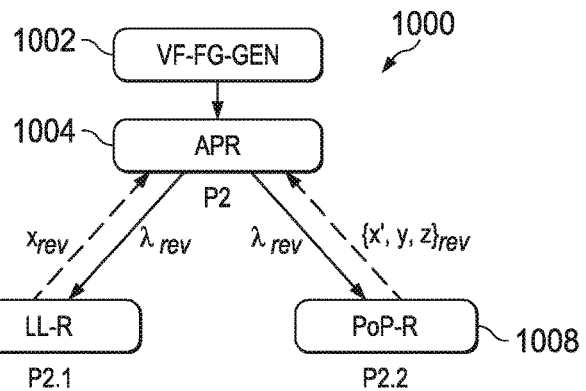
FIG. 10 illustrates an embodiment of a distributed optimization.

FIG. 10 illustrates an embodiment of a distributed optimization 1000. The distributed optimization 1000 includes a VF-FG generator 1002, an APR 1004, an LL-R 1006, and a PoP-R 1008. The sub-problems P2.1 and P2.2 are solved in parallel at the LL-R 1006 and the PoP-R 1008 respectively, while the outputs of the solvers are iteratively relayed to the APR 1004 in exchange for the updated dual variable $\lambda_{rev}$.

The dual variable is revised at the APR 1004 based on the received subgradients as, for example $\lambda = \lambda - \alpha(x' - x)$ where $\alpha$ is the step-size which can be either set to a fixed value or iteratively updated via line search techniques.

At each iteration, the solution obtained via dual decomposition converges to the lower bound of the primal problem given by $\Lambda^*(x,y,z,\lambda) \geq D(\lambda)$.

The iterative procedure stops at convergence or after a maximum number of iterations (a system parameter).

Figure 11:
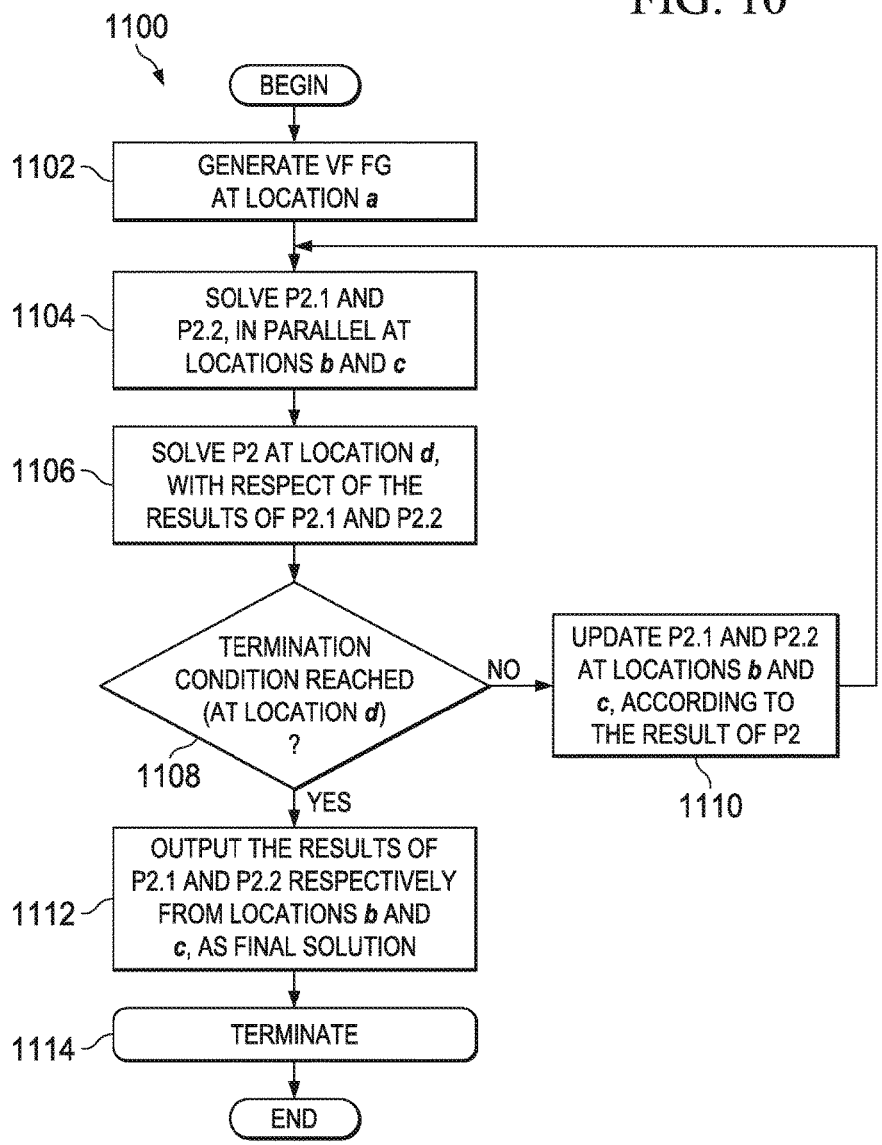
FIG. 11 illustrates a flowchart of an embodiment of a distributed algorithm method.

FIG. 11 illustrates a flowchart of an embodiment of a distributed algorithm method 1100. The method 1100 begins at block 1102 where the VF FG is generated at location a. At block 1104, the P2.1 and P2.2 problems are solved in parallel at locations b and c. At block 1106, P2 is solved at location d with respect of the results of P21 and P2.2. At block 1108, the method 1100 determines whether the termination condition has been reached at location d. If, at block 1108, the termination condition has not been reached, then the method 1100 proceeds to block 1110 where P2.1 and P2.2 are updated at locations b and c according to the result of P2, after which, the method 1100 proceeds to block 1104. If, at block 1108, the termination condition has been reached, then the method 1100 proceeds to block 1112 where the results of P2.1 and P2.2 are output from locations b and c, respectively, as the final solution. The method 1100 then proceeds to block 1114 where the method terminates.

A multi-service case embodiment is an extension of the singular service case. An optimization constraint should be either for individual services, or based on a combination (e.g., summation) of all or a sub set of the services. For example, a function is shared by a sub set of services; a NFVI PoP can be used only by a sub set of services; etc. In an embodiment, the objective should be based on the combination of all the services. Individual services can be weighted.

Figure 12A:
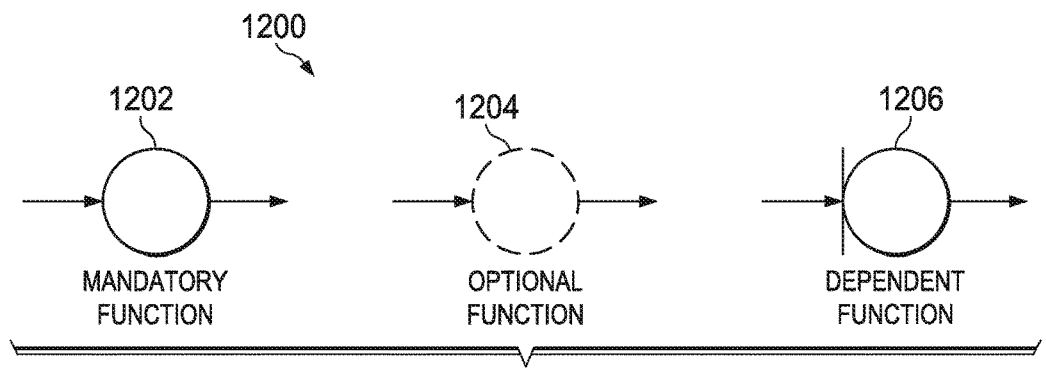
FIG. 12A is a diagram illustrating three types of functions showing the symbolic denotation VFs.
Figure 12B:
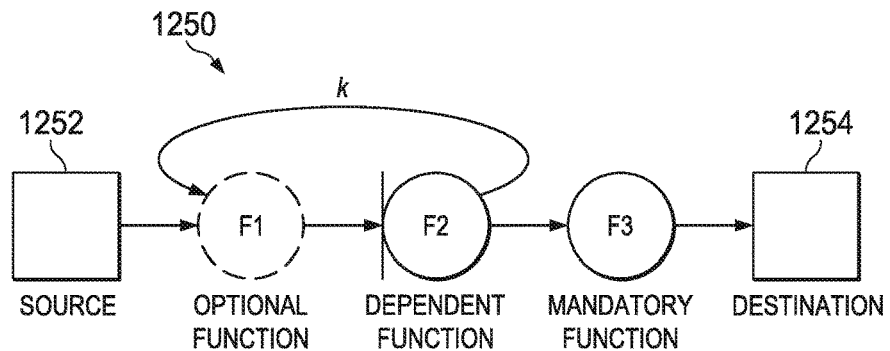
FIG. 12B is a diagram illustrating an embodiment of an SFC of three functions.
Figure 13:
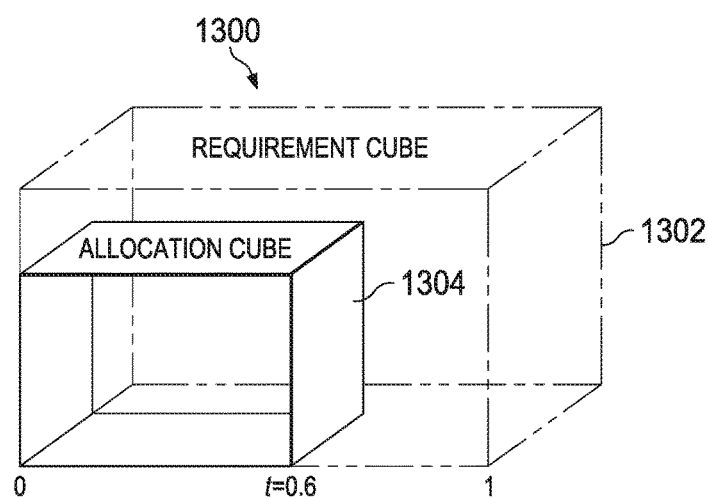
FIG. 13 is a diagram illustrating a relationship between a requirement cube and an allocation cube in an embodiment.

Turning now to FIGS. 12-14, an alternate embodiment is described.

Network slicing often involves the instantiation of certain virtualized network functionality into network nodes, possibly subject to some function chaining constraints. In an embodiment, as an integral aspect of network slicing, software defined topology (SDT) techniques are used to define service-specific data plane logical topologies including virtual function locations and the connections in between, based on which network slices are subsequently rendered via network function virtualization (NFV) and software defined networking (SDN).

In an embodiment, elastic service function chain is disclosed. An elastic service function chain is an ordered list of virtual functions that may be, in an embodiment, optional or recursive. In an embodiment, the problem of SDT is addressed with such chaining requirements. In an embodiment, the SDT problem is mathematically formulated as a combinatorial optimization problem that includes a multi-commodity flow problem and a bin packing problem as sub-problems. Because the problem inherits NP hardness from the bin packing sub problem and is not generally solvable within polynomial time, a fast heuristic algorithm is disclosed to tackle it.

The previous VF placement research considered only mandatory VFs, each of which requires at least one instance to be created in the network. In such a scenario, the function chaining requirement, if any exists, is not elastic, but stiff. The SDT problem analyzed herein and for which embodiment solutions are provided is a generic or extended VF placement problem that uniquely supports elastic SFCs, where optional VFs or vertically-recursive VFs are present and the decision on the occurrence or recurrence of such VFs is part of the solution. Unlike horizontal recursion that limits the number of instances of a VF, vertical recursion defines the number of times a VF appears as a separate function in the SFC.

Network slicing is an emerging concept of instantiating different "slices" of network resources directed toward different network services, which are typically offered to different customers or groups of customers and potentially have distinct QoS requirements and/or packet processing requirements. Network resources include both computing resources at network nodes (e.g. CPU, memory, storage, I/O, etc.) and bandwidth resources over network links. A network slice, also known as virtual network, corresponds to the allocation of pooled network resources for a given service such that the service appears substantially "isolated" from other services from the customer's point of view. In the context of network slicking, isolation implies that one service's performance is not negatively impacted by the traffic of another service.

Often times, network slicing involves the instantiation of certain network functionality into a network node. The identification of which nodes should be instantiated with which network functions in order to provide a desired service-level capability for a given network slice is subject to not only network resource constraints but also function chaining constraints (if any exists) and is typically manually provisioned. This procedure is automated so as to maximize flexibility and responsiveness of the network to changing customer demands. Automated network slicing can be applied in reconfigurable network architectures, in which pooled network resources are commercial off-the-shelf (COTS) hardware components capable of configuration through virtualization approaches such as software defined networking, network function virtualization, and software defined topology.

Software Defined Network (SDN)

SDN separates traffic management from traffic forwarding, enabling centralized control and enriched agility. In the SDN control plane, one or a few SDN controllers manage network resources (specifically, bandwidth resource) and control network traffic globally. Based on the status information from individual network elements and the overall traffic requirements, the controllers make traffic control decisions by solving a traffic engineering (TE) problem; according to the TE solution, they instruct, for example, via the OpenFlow southbound APIs, data plane hardware to forward packets for optimizing the operation of the entire network. TE is to jointly determine for individual flows the communication paths and rate allocation along the paths, with respect to their QoS requirements, e.g. rate demand, and network resource constraints, e.g. link capacity, so that a network utility is maximized. Flows are split among their routing paths in the data plane, following the TE decision in the control plane.

Network Function Virtualization (NFV)

While SDN provides the framework for achieving centralized control of a network and as a consequence, potentially globally optimal network performance, another degree of freedom for facilitating network operations is realized via the complementary concept of network function virtualization (NFV). In an embodiment, it is imperative for the network to support multitudes of services, each possibly distinguished by a sequence of service-specific functions in addition to their peculiar traffic characteristics. In this regard, NFV allows implementing, for example using various network functions such as deep packet inspection and address translation on demand as software entities on NFV enabled, COTS hardware, for example, OPNFV nodes, hence, effectively decoupling the network functions from the physical equipment. Thus, in an embodiment, the SDN controllers themselves are instantiated as virtualized functions in any high-capacity processor(s) residing within either a data center, server or a network node.

Software Defined Topology (SDT)

The combined SDN and NFV technologies provide a compelling solution for facilitating the rapid roll-out of highly programmable and flexible services while providing high degree of scalability and cost effectiveness for both customers and network operators. The inventors have recognized that there is a need for a component that joints SDN and NFV and guide their operations toward the network slicing goal, and SDT comes into play in this regard. For a given service, there are a number of virtual functions (VFs) for the service traffic to visit so as to meet the service-level functional requirement and/or to fulfill the networking purpose. One goal of SDT is to determine the locations of the VFs in the network and define a logical topology of the function locations. The nodes and links in the logical topology are respectively accompanied with computing resource requirements and traffic QoS requirements. A network slice is then rendered based on the logical topology for the service using NFV and SDN techniques.

In an embodiment, the procedure of network slicing is basically divided into two steps: slice framing (by SDT) and slice rendering (by NFV and SDN). This separation enables a network operator to perform dynamic slice rendering with a stable slice skeleton for optimizing network resource utilization and service-level QoS/E. Disclosed herein are embodiment systems and methods to address the SDT-centric, slice-framing step.

SDT Primitives

In the following, the primitives for the SDT problem that is considered is presented. Disclosed herein is a service function chain (SFC) and examples are provided to illustrate what an SFC looks like. Afterward, the performance of a VF in data processing rate (bits per second), in connection with computing resources is modeled. Such a performance model may be necessary so that the impact of computing resources on function location decision can be described in the SDT problem statement.

VF Classification and Chaining

A service is typically associated with a VF forwarding graph (VF-FG) that contains a collection of service function chains (SFCs), each being an ordered list of VFs. A VF is either a virtual service function (VSF) or a virtual networking function (VNF). A VSF is service-dependent, reflecting service business logic, and therefore usually defined by a customer, for example, a virtual service provider; whereas, a VNF is offered by the network operator for empowering the networking process. A customer is not usually a subject-matter expert in networking and very likely supplies a partial VF-FG involving only VSFs. The network operator customizes a networking procedure for a given service in accordance with the service's characteristics; it completes the customer-supplied partial VF-GG with the necessary VNFs for implementing the networking procedure.

In an SFC, there are one or more sources, one or more destinations, and a number of functions in between. The functions are connected one and another from the sources toward the destinations, implying the sequence in which they shall be traversed by the service traffic. Backward connections are used to indicate recursion of chain segments. A service can be divided into a number of primitive sub services such that each of them has a VF-FG that contains a single SFC, where there is a single destination; network slicing can be performed for the sub-services, rather than for the complex, original service. In this case, function sharing and traffic connection may have to be enforced among the sub-services so that a network slice for the original service can be recovered from the sub-network slices. Without loss of generality, the primitive service scenario is studied and SFC and VF-FG are used interchangeably.

In an embodiment, three types of VFs are considered: mandatory functions, optional functions, and dependent functions.

FIG. 12A is a diagram illustrating three types of functions 1200 showing the symbolic denotation VFs. The three functions 1200 include a mandatory function 1202, an optional function 1204, and a dependent function 1206.

A logical service function path (SFP) is a path linking the source and the destination in a data plane logical topology computed by the SDT. There may include multiple logical SFPs in a logical topology. Along a logical SFP, a mandatory function must appear at least once; an optional function may not be present at all; the existence of a dependent function depends on the appearance of its prior function.

FIG. 12B is a diagram illustrating an embodiment of an SFC 1250 of three functions. The SFC 1250 includes a source 1252, a destination 1254, and function F1, function F2, and function F3 where function F1 is an optional function, function F2 is a dependent function, and function F3 is a mandatory function. The segment of F1-F2 is allowed to repeat for up to k times, as indicated by the maximum recursion count over the backward link. In an embodiment, the value of k is always smaller than the number of NFV enabled nodes in the network as a VF may be instantiated at most once at a location. Note that the segment may appear at most k+1 times as its normal occurrence is counted separately. An SFC that contains optional or recursive VFs is referred to as elastic SFC. In the literature, only non-elastic SFCs have been studied. However, elastic SFC enables a new dimension of flexibility to network slicing, empowering the network system to add and/or remove VFs. With elastic SFC, not only slice rendering but also slice framing may become adaptive to the network dynamics. As such, the network system becomes more intelligent and self-evolving to intervene in the network operator's decision making. For example, it can help minimize costumers' capital cost in the context of smart data pricing (where pricing of VSF instantiation and management is situational) by not instantiating an optional VSF or reducing the vertical recursion of a VSF. In another example, it may autonomously alter the networking procedure of a service by dynamically removing an optional VNF or increasing the vertical recursion of a VNF according to network loading so as to accommodate or satisfy more service requests.

Computing Resource Modeling

Network slicing determines the locations, or points of presence for each of the VFs in the VF-FG of a service. When determining function locations, computing resource availability and its relation to VF performance must be considered in order to guarantee service QoS/E.

In the literature, it has been shown that high-level service objectives can be transformed into low-level resource allocation policies. For each VF, the provider (either a customer or the network operator) specifies a minimum (rigid) allocation and a maximum increment (fluid) allocation on a per-computing-resource-type basis. The former must be met in order for the VF to operate at the minimum acceptable level of performance, while the latter should be satisfied as much as possible, proportionally among all the resource types, for delivering best possible performance. Requirements on elementary (native) resource and aggregate (virtualized) resource can further be differentiated, as the latter may have overhead on the VF performance. For simplicity, the difference between native resource and virtualized resource is ignored, because a mapping between them can be generated through offline profiling according to previous study.

In an embodiment, the fluid resource requirement of a VF $f$ is viewed as a multi-dimensional cube, with each dimension being corresponding to a unique resource type. The cube may not likely be a regular cube, but skewed depending on the importance of individual dimensions in the function performance. As part of the SDT goal, a resource allocation cube proportional to the requirement cube is to be determined at each function location.

FIG. 13 is a diagram illustrating a relationship between a requirement cube 1302 and an allocation cube 1304 in one embodiment. The decision t is scalar value, in range 0 to 1, inclusive. The cubes 1302, 1304 can be normalized among all possible applications in order to make diverse computing resource requirements/allocations directly comparable. The cube-based measurement approach is known as a workload allocation cube (WAC).

In an embodiment, the performance $P_f$ of $f$ as data processing rate, in bits per second, measured and its relation with resource allocation decision is modeled by a resource efficiency (RE) factor $\upsilon_f$, which is function- and platform-dependent. Then, $P_f$ is computed by the following linear function:

$$P_f = \pi_f + \upsilon_f \times t,$$

where $\pi_f$ is the minimum perform that is attributed to rigid resource allocation. Furthermore, $\pi_f$ (and $\upsilon_f$) are defined to be identical across all computing platforms and vary the resource requirements to reflect platform difference.

It should be noted that building a generic function performance model is not trivial because it heavily depends on function logic, computing platform and implementation detail. Nevertheless, for a given function, an experiment-based modeling approach is available in real-world applications. For example, one may exploit the WAC technique and monitor the function performance with different WAC decisions. Then, apply curvy fitting on the monitoring results to extract the model. In order to be able to focus on the SDT problem and not to be hindered by the side problem of function performance modeling, the linear model above is used as a proof of concept. The disclosed systems and methods can readily accommodate any model as long as the model is convex.

A Solution

Assuming that the network operator has completed the VF-FGs of individual services, the goal of SDT is to compute service-specific data plane logical topologies for all services according to respective VF-FGs and other necessary information. The computation may be carried out jointly for multiple services together, or incrementally one service each time. When function sharing is allowed across services, node overlapping may appear between the logical topologies.

In an embodiment, an optimization approach to tackle the SDT problem is disclosed. In one disclosed approach, the first step is to augment a given SFC (i.e. VF-FG). In an embodiment, SFC augmentation ought to be performed in accordance with the types of the comprising functions. Based on the augmented SFC (A-SFC), the SDT problem is formulated as an optimization problem. In the second step, the SDT optimization problem is solved, for example, using an optimization tool kit, to obtain a solution.

VF-FG/SFC Augmentation

Figure 14A:
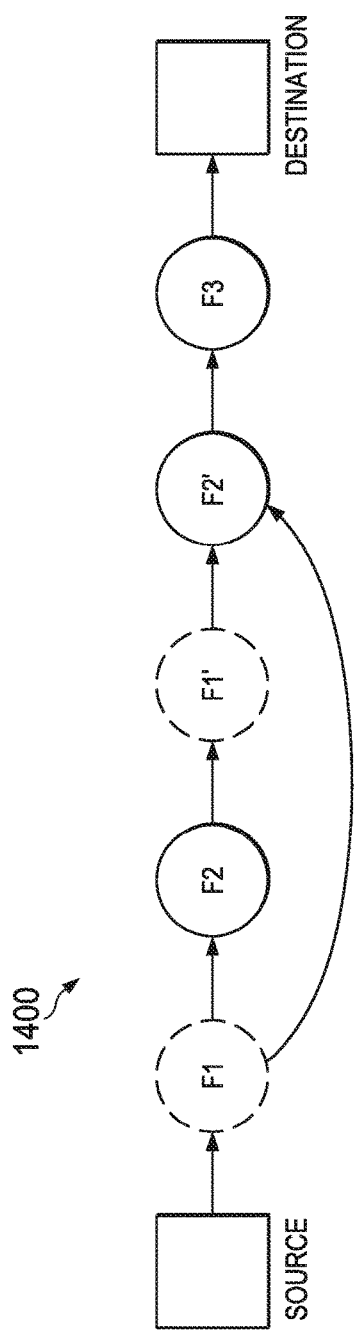
FIGS. 14A-14C are block diagrams illustrating the steps in a an embodiment method for SFC pre-processing for an SFC.
Figure 14B:
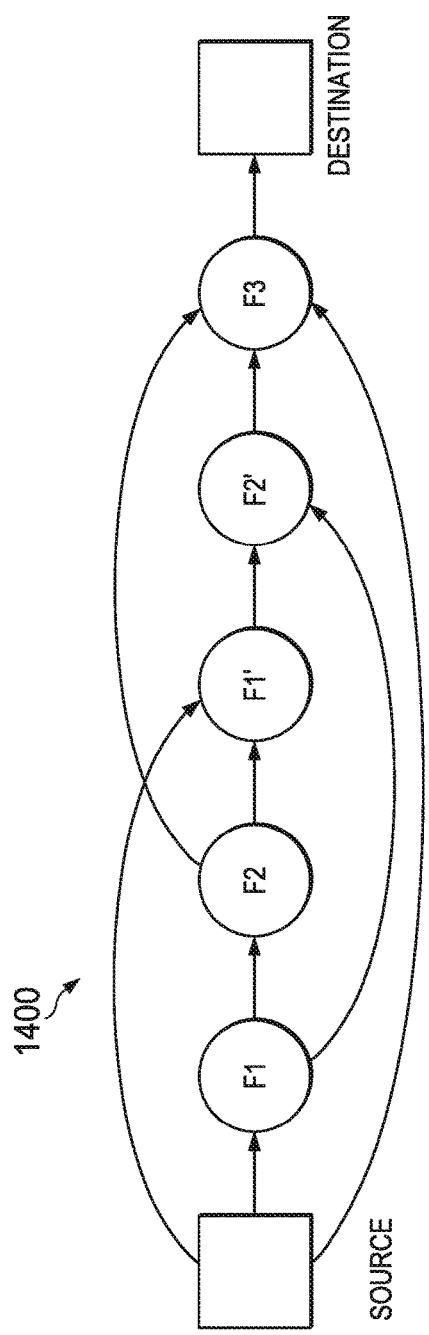
Figure 14C:
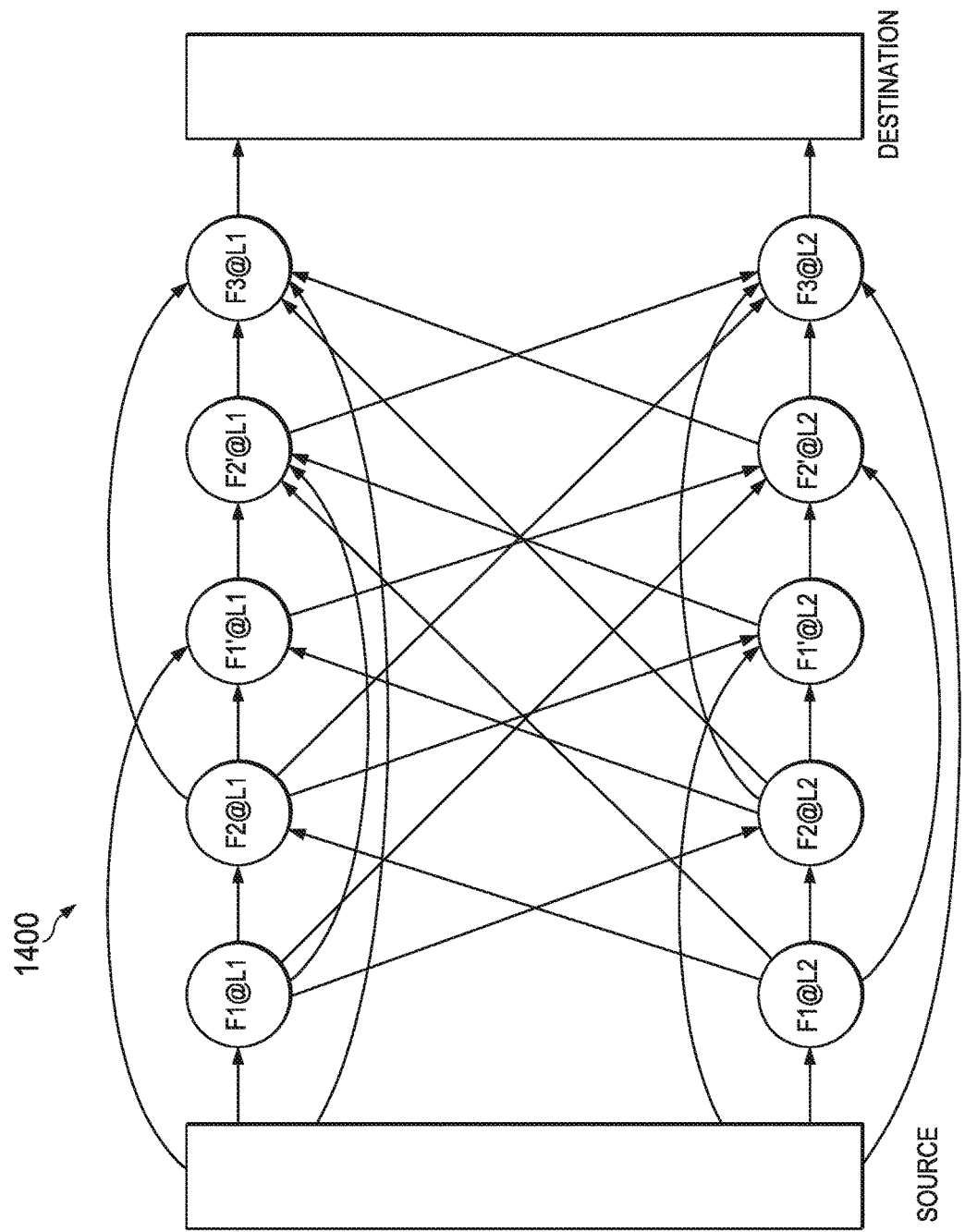

FIGS. 14A-14C are block diagrams illustrating the steps in an embodiment method for SFC pre-processing for an SFC 1400. The SFC includes a source 1402 and a destination 1404. Before augmenting an SFC 1400, the SFC 1400 is pre-processed through two steps. At the first step, recursive segments are unfolded to remove loops. For each recursive segment with up to k recursions (indicated by a backward connection in the SFC 1400), duplicate it adjacently along the chain for k times, and create arcs from a VF in any of these segments (the original or a duplicate) to a depending VF in any of the subsequent duplicate segments to enable function dependency across segments. The unfolding step may be described by an example, as shown in FIG. 14A where the segment F1'-F2' is the duplicate of the segment F1-F2 and the duplicate function F2' may depend on any of F1 and F1'. At the second step, the arcs created for enabling cross-segment function dependence at the first step can be ignored and the SFC 1400 is processed for optional functions. Next, optional segments can be identified. An optional segment starts from an optional function and ends at the first subsequent non-dependent function along the chain. For each optional segment, arcs are created between its prior segment and its next segment. In FIG. 14A, the loop-removed SFC has F1-F2 and F1'-F2' as optional segments. After the second step, it becomes as shown in FIG. 14B.

An augmented SFC (A-SFC), is a directed, acyclic graph, denoted as G(N,A) in which N are node set and A arc set. Given an arc a∈A, $a_{src}$ is used to denote the source end of a and $a_{dst}$ the destination end. An A-SFC augments an SFC in that it expands the pre-processed version of the SFC by duplicating each VF at every possible location (an NFV enabled network node). In an A-SFC, nodes N are therefore divided into three disjoint subsets: source node set S, destination node set D, and eta node set E. A source node has only out-going links; a destination node has only in-coming links. Eta nodes are intermediate nodes that have both out-going links and in-coming links. Each eta node corresponds to a unique pair of function and location and is denoted as $\eta_p^f$, implying the presence of function $f$ at location p. Given an e∈E, $e_{fun}$ denotes the respective function and by $e_{loc}$ the respective location. Arcs are created among nodes N according to the connectivity defined in the pre-processed SFC. FIG. 14(c) shows the final augmented SFC.

When there are multiple services, in an embodiment, for each service, the above augmentation is performed. In the final A-SFC, the source, destination, and eta node sets are respectively the union of the corresponding sets of individual services. If function sharing is possible and allowed, some eta nodes may be common to multiple services.

Problem Formulation

Table II lists the major denotations used herein. Many of them have a service-specific version, for which a superscript is used to distinguish. For example, the eta node set that belongs to service υ is denoted as $E^υ$; $\gamma_s^υ$ implies the data rate of source s in service υ; the incoming traffic rate related to service υ at an eta node e is represented by $r_e^{υ+}$; and so on and so forth.

TABLE II

KEY DENOTATIONS

| | |
|---|---|
| A | arc set (in a partial A-SFC) |
| L | link set (in a full A-SFC) |
| R | relay node set |
| S | source node set |
| N | total node set N = E ∪ S ∪ D |
| F | total service function set |
| P | total function PoP set and P ⊆ R |
| E | total eta node set |
| W | computing resource set |
| V | service set |
| C | set of must-not-collocate function groups |
| $\gamma_s$ | data rate of source s |
| $\beta_a$ | statistical capacity of arc a ∈ A |
| $\beta_l$ | capacity of link l ∈ L |
| $\varphi_a$ | cost factor of arc a ∈ A |
| $\varphi_l$ | cost factor of link l ∈ L |
| $o_p$ | basic operational cost of point p ∈ P |
| $d_p$ | maximum number of functions allowed at point p ∈ P |
| $g_f$ | maximum number of instances allowed for function f ∈ F |
| $\alpha_p^\omega$ | maximum amount of computing resource ω at point p ∈ P |
| $\rho_e$ | traffic reduction factor at eta node e ∈ E |
| $\zeta_e$ | maintenance cost of eta node e ∈ E |
| $\kappa_e^S$ | rigid requirement of eta node e on computing resource ω ∈ W |
| $\kappa_e^E$ | fluid requirement of eta node e on computing resource ω ∈ W |
| $\pi_e$ | minimum performance of function of eta node e ∈ E |

TABLE II-continued

KEY DENOTATIONS

| | |
|---|---|
| $v_e$ | fluid resource efficiency of function of eta node e ∈ E |
| $\gamma_e^+$ | incoming traffic rate to an eta node e ∈ E |
| $x_l$ | rate allocation over link l ∈ L |
| $y_e$ | binary indicator of non-zero incoming rate to eta node e |
| $x_p$ | binary indicator of non-zero incoming rate to point p ∈ P |
| $t_e$ | fluid resource allocation ratio of eta node e ∈ E |
| $q_p^\omega$ | utilization ratio of computing resource ω at point p ∈ P |
| $\lambda_s$ | the proportion at which the traffic rate of source s is satisfied |
| $\lambda$ | minimum rate satisfaction among all sources |
| $\delta$ | maximum computational overloading among all eta nodes e ∈ E |
| $\sigma$ | maximum resource over utilization among all NFV-enabled nodes p ∈ P |
| M | a suitably large value |

For ease of presentation, for every eta node e, $\pi_e = \pi_{e_{fun}}$ and $v_e = v_{e_{fun}}$ is defined. Given rigid resource allocation decision $y_e$, $y_e \in \{0,1\}$ and fluid resource allocation decision $t_e$, $0 \leq t_e \leq 1$, the performance of e, namely the performance of the instance of function $e_{fun}$ at location $e_{loc}$ is therefore computed according to resource modeling described above as:

$$P_e = \pi_e y_e + v_e t_e$$

The performance of a service is reflected in two aspects: traffic performance and function performance. Along the service function chain, they are coupled by the well-known queuing theory. That is, at any eta node e, the incoming traffic rate $r_e$ should not be larger than the processing rate $P_e$ in order not to have congestion. Maximizing a service's performance therefore implies maximizing the service's traffic rate satisfaction with respect to the computing resource allocation on eta nodes confined by this constraint.

In the SDT problem presented here, in an embodiment, it is desirable to maximize the minimum service performance among all services present in the network as well as minimize the cost, which is defined as the total cost on NFV-enabled network nodes, logical arcs (in the A-SFC graph), and network links (in the network graph); namely, $$C(x,y,z,r) = \mu \Sigma_{p \in P}(o_p z_p + \Sigma_{e \in E: e_{loc}=p} \zeta_e y_e) + v \Sigma_{a \in A} \varphi_a r_a + (1-\mu-v) \Sigma_{l \in L} \varphi_l x_l,$$

where $0 \leq \mu, v \leq 1$ are weighting factors and $\mu+v \leq 1$. Define the minimum traffic satisfaction among all sources across all services as $\lambda = \min_{s \in S^υ, υ \in S} \lambda_s^υ$. The SDT problem can be formulated as a combinatorial optimization problem with a maximization objective of:

$$U(x,y,z,r,\lambda) = \omega\lambda - (1-\omega)C(x,y,z,r);$$

where $0 \leq \omega \leq 1$ is a weighting factor. The mathematical formulation is presented in Problem 1. It should be noted that in real-world applications, other SDT objectives are possible, up to the network operator's definition.

This SDT problem contains two sub-problems: a hierarchical multi-commodity flow (HMCF) problem over the A-SFC and the physical network graph and a network cost minimization (NCM) problem on the NFV-enabled nodes. A second embodiment algorithm is illustrated below.

Problem 1 (*SDT*):

$$\max U(x, y, z, q, r, \lambda) - M(\delta + \sigma),$$
subject to $$\sum_{a \in A: a_{src}=s} r_a^υ = \lambda_s^υ \gamma_s^υ, \forall s \in S^υ, \forall υ \in V \quad (1)$$

-continued $$\sum_{a \in A: a_{src}=e} r_a^\upsilon = \gamma_e^{\upsilon+}, \forall e \in E^\upsilon, \forall \upsilon \in V \quad (2)$$

$$\sum_{a \in A: a_{src}=e} r_a^\upsilon = \rho_e \gamma_e^{\upsilon+}, \forall e \in E^\upsilon, \forall \upsilon \in V \quad (3)$$

$$\sum_{\upsilon \in V} r_a^\upsilon \leq \beta_a, \forall a \in A \quad (4)$$

$$\lambda \leq \lambda_s^\upsilon, \forall s \in S^\upsilon, \forall \upsilon \in V \quad (5)$$

$$\sum_{l \in L: l_{src}=a_{src}} x_l^\upsilon = r_a^\upsilon, \forall a \in A, \forall \upsilon \in V \quad (6)$$

$$\sum_{l \in L: l_{dst}=a_{dst}} x_l^\upsilon = r_a^\upsilon, \forall a \in A, \forall \upsilon \in V \quad (7)$$

$$\sum_{l \in L: l_{src}=n} x_l^\upsilon = \sum_{l \in L: l_{dst}=n} x_l^\upsilon, \forall n \in R, \forall \upsilon \in V \quad (8)$$

$$\sum_{\upsilon \in V} x_l^\upsilon \leq \beta_l, \forall l \in L \quad (9)$$

$$\sum_{\upsilon \in V} r_e^{\upsilon+} \leq M y_e, \forall e \in E \quad (10)$$

$$y_e \leq z_{e_{loc}}, \forall e \in E \quad (11)$$

$$\sum_{e \in E: e_{fun}=f} y_e \leq g_f, \forall f \in F \quad (12)$$

$$\sum_{e \in E^\upsilon: e_{fun} \in F^c, e_{loc}=p} y_e \leq 1, \forall p \in P, \forall c \in C^\upsilon, \forall \upsilon \in V \quad (13)$$

$$t_e \leq y_e, \forall e \in E: e_{loc}=p, \forall p \in P \quad (14)$$

$$\sum_{e \in E^\upsilon: e_{loc}=p} y_e \leq d_p^\upsilon, \forall \upsilon \in V, \forall p \in P \quad (15)$$

$$\pi_e y_e - \upsilon_e t_e - \gamma_e^+ \leq \delta, \forall e \in E: e_{loc}=p, \forall p \in P \quad (16)$$

$$\sum_{e \in E: e_{loc}=p} (y_e \kappa_e^w + t_e \kappa_e'^w) = q_p^w \alpha_p^w, \forall w \in W, \forall p \in P \quad (17)$$

$$q_p^w - z_p \leq \sigma, \forall w \in W, \forall p \in P \quad (18)$$

$$q, r, t, x \geq 0; \delta, \sigma \geq 0 \quad (19)$$

$$y, z \in \{0, 1\} \quad (20)$$

The first group of constraints, (1)-(9), belong to the HMCF problem; the second group of constraints, (10)-(18), belong to the NCM problem. The two problems are coupled through the eta node incoming rate variables $\gamma_e^{\upsilon+}$. It should be noted that the NCM problem is a variant of the NP-hard Bin Packing problem. The overall SDT problem is therefore NP hard by naturalization. Examine the HMCF problem, in which two levels of MCF decision are made. At the top level, the disclosed systems and methods decide whether and how each arc in the A-SFC is used. The per-service constraints (1)-(3) and the per-arc constraint (4) are applied for this level of decision. In particular, Constraint (1) computes the allocated source rate, and Constraint (2) computes the incoming rate to each eta node. Constraint (3) ensures flow conservation at each eta node with respect to the eta node's traffic rate reduction factor. Constraint (4) makes sure the rate allocation over each arc is not larger than an upper bound, which is may be configured as infinity. Constraint (5) computes the minimum source rate among all services. At the bottom level, the HMCF problem decides how to support the first-level decision using physical links, by treating each arc as a flow and applying conventional MCF constraints. Constraints (6) and (7) ensure flow satisfaction, while Constraints (8) and (9) are respectively flow conservation constraint and link capacity constraint.

It is worth noting that, as a common practice in mathematical programming, aggregation techniques may be applied to flows and nodes to reduce problem complexity. For example, flows destining to the same node may be aggregated into a single flow; destinations of flows originating from the same node may be aggregated as a single node; and so on. The SDT problem is presented for clarity in a straightforward way without applying aggregation.

Turning now to the NCM constraints, Constraints (10) and (11) respectively converts eta node incoming rate decision to VF placement (location selection) decision and computes NFV-enabled node activation decision. Constraint (12) is horizontal recursion constraint, limiting the number of selected eta nodes of a function to below a given upper bound. Constraint (13) is the function non-collocation constraint. Constraint (14) enforces that no fluid resource allocation happens at any un-selected function location. Constraint (15) states that the number of functions hosted at the same point cannot be larger than a maximum value. Constraint (16) enforces $\delta$ to equal the maximum overloading, i.e. difference between incoming traffic rate and data processing rate at an eta node, among all the eta nodes at solution. Constraint (17) computes the resource utilization ratio at each NFV-enabled node; Constraint (18) enforces $\sigma$ to equal the maximum resource over-utilization at the NFV-enabled nodes at solution. In an embodiment, the solution is penalized by $\delta$ and $\sigma$ as indicated by the last term in the objective function.

A Practical Heuristic Solution

The SDT problem is NP hard because it contains the Bin Packing as a sub problem, which is a well-known NP hard problem. There is no polynomial-time solution to it in general. The optimal solution presented in the previous section requires to solve the SDT problem optimally, thus not practical when the problem size is large. A common practice when solving such a combinatorial problem is to apply the classic branch-and-bound approach. In this section, the NP hardness is tackled through a heuristic algorithm that exploits both the branch-and-bound approach (a simplified version that disallows backtracking for fast convergence) and the special structure of the SDT problem.

The algorithm maintains two eta node sets $E_0$ and $E_1$. The former contains eta node whose y values are fixed to 0; the latter contains eta nodes whose y values are fixed to 1. Let E' represent the remainder set, i.e. $E'=E\setminus(E_0 \cup E_1)$. Initially, both $E_0$ and $E_1$ are empty, and E' is identical as E. Furthermore, it maintains the most recent SDT optimization objective function value by a variable Obj. The algorithm is composed of three successive steps: bootstrapping, filtering and greedy selection. These steps are elaborated on below. For ease of presentation, refer to the status of an eta node as 'off' (or 'on') if the eta node's y value is set to 0 (resp. 1).

A. Bootstrapping Through Relaxation

Iteratively perform the following steps to update $E_0$ and $E_1$ up to a maximum number of times or until they stabilize.

1) Relax y and z to be real variables in Problem (1) and solve the relaxed problem with the y variables of eta nodes in $E_1$ as constant variables. If the problem is infeasible, record the objective function value into Obj and terminate the current iteration; otherwise, it proceeds with the subsequent steps.

2) Choose two threshold values $0 \leq \theta_1 \leq \theta_2 \leq 1$. In the fractional solution, identify the group of eta nodes with a y value not smaller than $\theta_2$ and move them into a temporary set $E'_1$. Among the remaining eta nodes, find those with a y value not larger than $\theta_1$ and move them into a temporary set $E'_0$. The horizontal recursion constraint (12) on individual VFs must be respected.

3) Verify the function non-collocation constraint (13) against $E'_0$, and $E'_1$, and remove from the two sets the eta nodes involved in a constraint violation (if any exits). Then, set $E_0=E'_0$, and $E_1=E'_1$, and the current iteration terminates.

If Obj remains uninitialized, implying that the SDT problem is infeasible, the algorithm terminates; otherwise, it proceeds.

Comment 1: The thresholds $\theta_1$; $\theta_2$ should be defined on a per VF basis so as to accommodate the heterogeneous y value distribution of different VFs. They should be selected carefully such that the instance count constraint (12) is not violated while sufficient flexibility is left for making function location decision.

Problem 2 (Simplified SDT):

$$\max\ U(x,q,r,\lambda) - M(\delta+\sigma),$$

subject to (1)-(9), (14)-(19). This problem is a simplified form of Problem (1) in that it takes y, z as input rather than as decision variables.

B. Filtering by Enforcing Non-Collocation Constraints

In E', at each location $p \in P$ identify the groups of eta nodes that are not allowed to be on simultaneously according to the function non-collocation constraint (13). Define two temporary sets $E'_0$, and $E'_1$. Process each group independently via the following steps:

1) Initialize all the eta nodes in the group to be off with all the other eta nodes in E' being on.
2) Test each eta node in the group individually as follows: turn the eta node on, evaluate z, solve Problem (2) with y; z being constant variables, and record the problem feasibility and objective function value.
3) From the test results, find the eta node whose being turned on leads to feasibility or maximum increase or least decrease in the objective function value (by comparing to the value of Obj), move it into $E'_1$ and the rest into $E'_0$, and update Obj.

Afterward, update $E_0$ and $E_1$ by setting $E_0=E_0 \cup E'_0$, $E_1=E_1 \cup E'_1$.

Comment 2: In face of a tie for eta node selection (e.g. in Steps B.3)), a choice can be made randomly or according to certain selection policy. The policy can be tailored in favor of the benefit in some particular aspect(s), such as performance-first policy, cost-first policy, constraint-first policy. These three polices respectively indicate the eta node resulting in a favorable maximum performance increase (e.g. in terms of minimum performance or mean performance), a minimum cost increase, or minimum constraint violations to be selected. Regardless of what policy to use, a random choice may sometime be inevitable for tie breaking.

C. Greedy Selection by Turning-Off of Eta Nodes

Temporarily turn on all the eta nodes in E'. Solve Problem (2) in this temporary situation and update Obj with the result. In E', identify the groups of eta nodes corresponding to individual optional functions. Sort the groups according to their order in the SFC. Sequentially process each group along the sorted list through the following iterative procedure, which terminates when the group becomes empty.

1) Check if the initial members of the group handled in the previous iteration are all off (if any exists). If they are, move all the eta nodes of the dependent functions (either directly or through a dependency chain) of the previous group into $E_0$.
2) Test each eta node in the group individually as follows: turn the eta node off, evaluate z, solve Problem (2) with y; z being constant variables; if the problem is infeasible, move the eta node into $E_1$.
3) From the test results, find the eta node whose being turned off leads to maximum increase or least decrease in the objective function value, move it into $E_0$, and update Obj. A tie can be broken based on certain pre-defined policies.

Then, process the eta nodes in E', which all belong to a mandatory function, in the same way as above. Solve Problem (2) afterward with $E_0$ and $E_1$ to obtain a base solution. Modify the base solution by moving eta nodes with low incoming traffic rate from $E_1$ to $E_0$ to satisfy the horizontal recursion constraint (12) for each function. Resolve Problem (2) with updated $E_0$ and $E_1$ to obtain a final solution.

Comment 3: The enforcement of horizontal recursion constraints can be carried out through an alternative procedure similar to Steps C.2) and C.3) with increased complexity: process the functions whose horizontal recursion constraints are violated in the order in the SFC; when processing a function, turn off eta nodes incrementally, one at a time until the horizontal recursion constraint is satisfied; the processing result is applied immediately in the subsequent function process.

Figure 15:
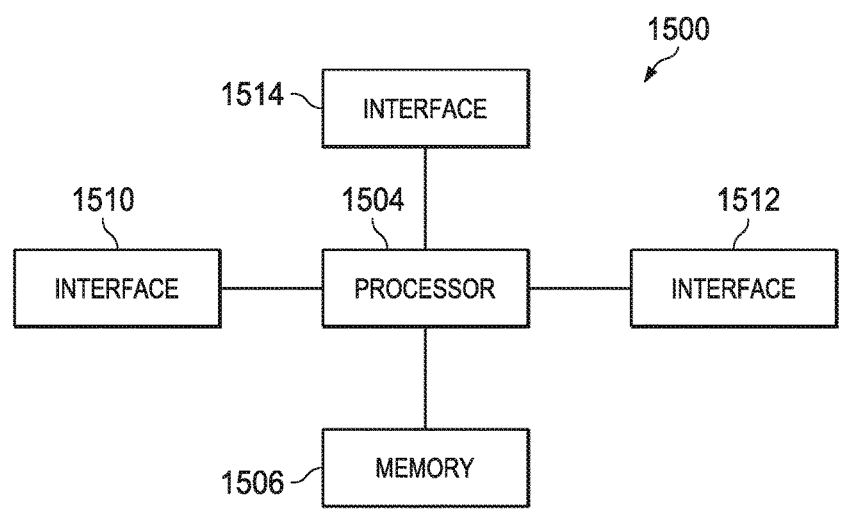
FIG. 15 illustrates a block diagram of an embodiment processing system for performing methods described herein, which may be installed in a host device.

FIG. 15 illustrates a block diagram of an embodiment processing system 1500 for performing methods described herein, which may be installed in a host device. As shown, the processing system 1500 includes a processor 1504, a memory 1506, and interfaces 1510-1514, which may (or may not) be arranged as shown in FIG. 15. The processor 1504 may be any component or collection of components adapted to perform computations and/or other processing related tasks, and the memory 1506 may be any component or collection of components adapted to store programming and/or instructions for execution by the processor 1504. In an embodiment, the memory 1506 includes a non-transitory computer readable medium. The interfaces 1510, 1512, 1514 may be any component or collection of components that allow the processing system 1500 to communicate with other devices/components and/or a user. For example, one or more of the interfaces 1510, 1512, 1514 may be adapted to communicate data, control, or management messages from the processor 1504 to applications installed on the host device and/or a remote device. As another example, one or more of the interfaces 1510, 1512, 1514 may be adapted to allow a user or user device (e.g., personal computer (PC), etc.) to interact/communicate with the processing system 1500. The processing system 1500 may include additional components not depicted in FIG. 15, such as long term storage (e.g., non-volatile memory, etc.).

In some embodiments, the processing system 1500 is included in a network device that is accessing, or part otherwise of, a telecommunications network. In one example, the processing system 1500 is in a network-side device in a wireless or wireline telecommunications network, such as a base station, a relay station, a scheduler, a controller, a gateway, a router, an applications server, or any other device in the telecommunications network. In other embodiments, the processing system 1500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1510, 1512, 1514 connects the processing system 1500 to a transceiver adapted to transmit and receive signaling over the telecommunications network.

Figure 16:
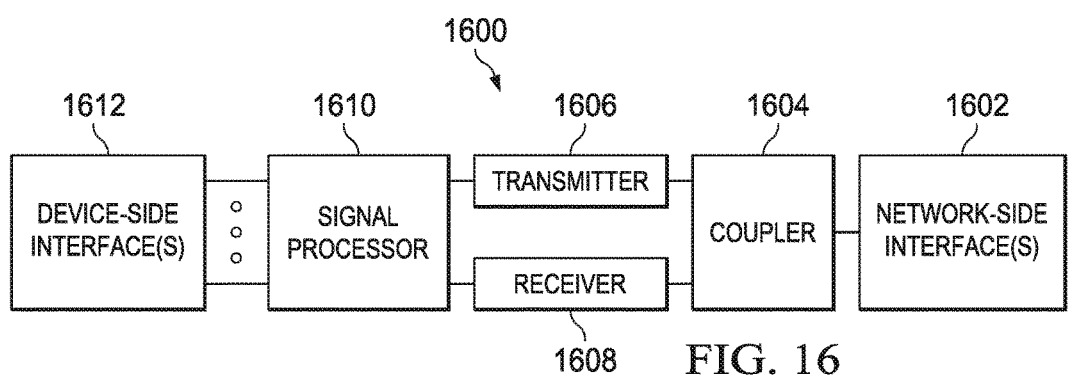
FIG. 16 illustrates a block diagram of a transceiver adapted to transmit and receive signaling over a telecommunications network.

FIG. 16 illustrates a block diagram of a transceiver 1600 adapted to transmit and receive signaling over a telecommunications network. The transceiver 1600 may be installed in a host device. As shown, the transceiver 1600 includes a network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless or wireline telecommunications network. The coupler 1604 may include any component or collection of components adapted to facilitate bi-directional communication over the network-side interface 1602. The transmitter 1606 may include any component or collection of components (e.g., up-converter, power amplifier, etc.) adapted to convert a baseband signal into a modulated carrier signal suitable for transmission over the network-side interface 1602. The receiver 1608 may include any component or collection of components (e.g., down-converter, low noise amplifier, etc.) adapted to convert a carrier signal received over the network-side interface 1602 into a baseband signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1610 and components within the host device (e.g., the processing system 1500, local area network (LAN) ports, etc.).

The transceiver 1600 may transmit and receive signaling over any type of communications medium. In some embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1602 includes one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In a disclosed embodiment, a method for software defined topology (SDT) management interworking with network function virtualization (NFV) and software defined networking (SDN) includes receiving, at an SDT Manager, from a service customer, a service request comprising a virtual service function forwarding graph (VSF FG); selecting a virtual network function (VNF) forwarding graph (FG) template in accordance with the received service request; generating a virtual function (VF) FG in accordance with the service request and the selected VNF FG template; selecting a point of presence (PoPs) for a VF in the VF FG; and transmitting, to an NFV Manager, instructions to instantiate the VF in accordance with at least one of the generated VF FG and the determined PoP. In an embodiment, the service request further includes at least one of compute resource requirements associated with the VSF FG, a traffic distribution, traffic characteristics, and mobility information. In an embodiment, the step of generating the VF FG in accordance with the service request and the selected VNF FG template further includes generating the VF FG in accordance with the service request, the selected VNF FG template, traffic information, and NFV infrastructure (NFVI) information. In an embodiment, the step of generating the VF FG in accordance with the service request and the selected at least one VNF FG template further includes iteratively determining a logical link recommendation until a termination condition is satisfied. In an embodiment, the step of generating the VF FG in accordance with the service request and the selected at least one VNF FG template further includes iteratively determining the PoPs until a termination condition is satisfied. In an embodiment, the service request does not include networking details. In an embodiment, the method further includes determining logical links (LLs) between service traffic sources, service traffic sinks, and VF PoPs. In an embodiment, the method further includes transmitting, in accordance with the determined LLs, to an SDN Controller, instructions to provision LL by defining physical paths and allocating resources along the defined physical paths, the physical resources including bandwidth. In an embodiment, the step of selecting a PoP includes selecting a PoP in accordance with at least one of network resource requirements associated with the VSF FG, and a match between geographic location of networking resources and a topology associated with the VSF FG.

In a disclosed embodiment, a software defined topology (SDT) manager includes a processor and a non-transitory computer readable storage medium storing programming for execution by the processor, the programming including instructions to: receive, from a service customer, a service request comprising a virtual service function forwarding graph (VSF FG); select a virtual network function (VNF) forwarding graph (FG) template in accordance with the received service request; generate a virtual function (VF) FG in accordance with the service request and the selected VNF FG template; select a points of presence (PoPs) for a VF in the VF FG; and transmit, to an NFV Manager, instructions to instantiate the VF in accordance with at least one of the generated VF FG and the determined PoP. In an embodiment, the service request further comprises at least one of compute resource requirements associated with the VSF FG, a traffic distribution, traffic characteristics, and mobility information. In an embodiment, the instructions for generating the VF FG in accordance with the service request and the selected VNF FG template further include instructions for generating the VF FG in accordance with the service request, the selected VNF FG template, traffic information, and NFV infrastructure (NFVI) information. In an embodiment, the instructions for generating the VF FG in accordance with the service request and the selected at least one VNF FG template further includes instructions for iteratively determining a logical link recommendation until a termination condition is satisfied. In an embodiment, the instructions for generating the VF FG in accordance with the service request and the selected at least one VNF FG template further include instructions for iteratively determining the PoPs until a termination condition is satisfied. In an embodiment, the service request does not include networking details. In an embodiment, the programming further includes instructions for determining logical links (LLs) between service traffic sources, service traffic sinks, and VF PoPs. In an embodiment, the programming further includes instructions to transmit, in accordance with the determined LLs, to an SDN Controller, instructions to provision LL by defining physical paths and allocating resources along the defined physical paths, the physical resources including bandwidth. In an embodiment, the instructions to select a PoP include selecting a PoP in accordance with at least one of network resource requirements associated with the VSF FG, and a match between geographic location of networking resources and a topology associated with the VSF FG.

In a disclosed embodiment, a network controller includes a software defined topology (SDT) component including a processor and non-transitory computer readable media and an interface, wherein the SDT component includes: a template selector, a virtual function (VF) forwarding graph (FG) generator that generates a VF FG according to at least one virtual network function (VNF) forwarding graph (FG) template selected by the template selector, a service request from a customer, traffic information, and NFVI information, the service request including a virtual service function forwarding graph (VSF FG); and a points of presence (PoP) and logical links (LL) generator that determines VF PoP information and determines LL information for LLs between service traffic sources, service traffic sinks, and VN PoPs according to the VF FG, the service request, the traffic information, and the NFVI information, and wherein the interface provides at least one of the VF FG, the PoP information, and the LL information to at least one of a NFV-management and organization (MANO) component and a software defined networking (SDN) traffic engineering (TE) component. In an embodiment, the SDT component is included in the NFV-MANO component. In an embodiment, the SDT component is external to the NFV-MANO component. In an embodiment, the SDT component includes a first SDT component and a second SDT component, wherein the second SDT component is included within the NFV-MANO component. In an embodiment, the PoP and LL generator includes an approver component, a LL recommender, and a PoP recommender, wherein the LL recommender determines a LL decision through a first iterative feedback process with the approver, and wherein the PoP recommender determines a PoP decision through a second iterative feedback process with the approver. In an embodiment, the first iterative feedback process and the second iterative feedback process occur in parallel. In an embodiment, an output of the PoP and LL generator includes a service-specific network logical topology.

The following references are related to subject matter of the present application. Each of these references is incorporated herein by reference in its entirety:

[1] S. Sezer, S. Scott-Hayward, P.-K. Chouhan, B. Fraser, D. Lake, J. Finnegan, N. Viljoen, M. Miller, and N. Rao, "Are We Ready for SDN? Implementation Challenges for Software-Defined Networks," IEEE Communications Magazine, vol. 51, no. 7, pp. 36-43, 2013.

[2] H. Hawilo, A. Shami, M. Mirahmadi, and R. Asal, "NFV: State of the Art, Challenges and Implementation in Next Generation Mobile Networks (vEPC)," IEEE Network, vol. 28, no. 6, pp. 18-26, 2014.

[3] H. Zhang, S. Vrzic, G. Senarath, N.-D. Dao, H. Farmanbar, J. Rao, C. Peng, and H. Zhuang, "5G Wireless Network: MyNET and SONAC," IEEE Network, vol. 29, no. 4, pp. 14-23, 2015.

[4] F. Hu, Q. Hao, and K. Bao, "A Survey on Software-Defined Network and OpenFlow: From Concept to Implementation," IEEE Communications Surveys & Tutorials, vol. 16, no. 4, pp. 2181-2206, 2014.

[5] Open Platform for NFV, https://www.opnfv.org.

[6] H. Tullberg, et al., "METIS system Concept: The Shape of 5G to Come," IEEE Communications Magazine, 2015.

[7] J. Halpern and C. Pignataro, "Service Function Chaining (SFC) Architecture," IETF RFC 7665, October 2015. https://tools.ietf.org/html/rfc7665.

[8] Y. Chen, S. Iyer, X. Liu, D. Milojicic, and A. Sahai, "Translating service level objectives to lower level policies for multi-tier services," Cluster Computing, 11(3): 299-311, 2008.

[9] D. Dolev, D. G. Feitelson, J. Y. Halpern, R. Kupferman, and N. Linial, "No justified complaints: On fair sharing of multiple resources," Proc. ITCS, pp. 68-75, 2012.

[10] M. Stillwell, F. Vivien, and Casanova, "Virtual machine resource allocation for service hosting on heterogeneous distributed platforms," Proc. IEEE IMPS, pp. 786-797, 2012.

[11] T. Wood, L. Cherkasova, K. Ozonat, and P. Shenoy, "Profiling and modeling resource usage of virtualized applications," Proc. ACM/IFIP/USENIX Middleware, pp. 366-387, 2008.

[12] J. D. Cowan, D. Seymour, and J. Carlington, "Method and System for Determining Computing Resource Usage in Utility Computing," U.S. patent application No. 61/107,557, 6Fusion USA Inc., Oct. 22, 2009. Granted.

[13] J. Clausen, "Branch and Bound Algorithms—Principles and Examples," Department of Computer Science, University of Copenhagen, Denmark, 1999. Internet resource: http://citeseerx.ist.psu.edu/viewdoc/summary-?doi=10.1.1.5.7475.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for software defined topology (SDT) management interworking with network function virtualization (NFV) and software defined networking (SDN) comprising:
receiving, at an SDT Manager, from a service customer, a service request comprising a virtual service function forwarding graph (VSF FG);
selecting a virtual network function (VNF) forwarding graph (FG) template in accordance with the received service request;
generating a virtual function (VF) FG in accordance with the service request and the VNF FG template, the VF FG excluding an optional VF in either the VSF FG or the VNF FG template;
selecting a point of presence (PoP) for a VF in the VF FG; and
transmitting, to an NFV Manager, instructions to instantiate the VF in accordance with the VF FG and the PoP, the VF FG comprising recursion of a vertically-recursive VF in either the VSF FG or the VNF FG template, a number of times the vertically-recursive VF appears as a separate function in the VF FG being determined in accordance with the service request and the VNF FG template.

2. The method of claim 1, wherein the service request further comprises at least one of compute resource requirements associated with the VSF FG, a traffic distribution, traffic characteristics, and mobility information.

3. The method of claim 1, wherein the step of generating the VF FG in accordance with the service request and the VNF FG template further comprises generating the VF FG in accordance with the service request, the VNF FG template, traffic information, and NFV infrastructure (NFVI) information.

4. The method of claim 1, wherein the step of generating the VF FG in accordance with the service request and the VNF FG template further comprises iteratively determining a logical link recommendation until a termination condition is satisfied.

5. The method of claim 1, wherein the step of generating the VF FG in accordance with the service request and the VNF FG template further comprises iteratively selecting the PoP for the VF in the VF FG until a termination condition is satisfied.

6. The method of claim 1, further comprising determining logical links (LLs) between service traffic sources, service traffic sinks, and VF PoPs.

7. The method of claim 6, further comprising transmitting, in accordance with the determined LLs, to an SDN Controller, instructions to provision LLs by defining physical paths and allocating resources along the defined physical paths, the resources including bandwidth.

8. The method of claim 1, wherein selecting the PoP for the VF in the VF FG includes selecting the PoP in accordance with at least one of network resource requirements associated with the VSF FG, and a match between geographic location of networking resources and a topology associated with the VSF FG.

9. A software defined topology (SDT) manager comprising:
 a processor; and
 a non-transitory computer readable storage medium storing programming for execution by the processor, the programming including instructions to:
  receive, from a service customer, a service request comprising a virtual service function forwarding graph (VSF FG);
  select a virtual network function (VNF) forwarding graph (FG) template in accordance with the received service request;
  generate a virtual function (VF) FG in accordance with the service request and the VNF FG template, the VF FG excluding an optional VF in either the VSF FG or the VNF FG template;
  select a point of presence (PoP) for a VF in the VF FG; and
  transmit, to a network function virtualization (NFV) Manager, instructions to instantiate the VF in accordance with the VF FG and the PoP, the VF FG comprising recursion of a vertically-recursive VF in either the VSF FG or the VNF FG template, a number of times the vertically-recursive VF appears as a separate function in the VF FG being determined in accordance with the service request and the VNF FG template.

10. The SDT manager of claim 9, wherein the service request further comprises at least one of compute resource requirements associated with the VSF FG, a traffic distribution, traffic characteristics, and mobility information.

11. The SDT manager of claim 9, wherein the instructions to generate the VF FG in accordance with the service request and the VNF FG template further comprises instructions to generate the VF FG in accordance with the service request, the VNF FG template, traffic information, and NFV infrastructure (NFVI) information.

12. The SDT manager of claim 9, wherein the instructions to generate the VF FG in accordance with the service request and the VNF FG template further comprises instructions to iteratively determine a logical link recommendation until a termination condition is satisfied.

13. The SDT manager of claim 9, wherein instructions for generating the VF FG in accordance with the service request and the VNF FG template further comprises instructions to iteratively select the PoP until a termination condition is satisfied.

14. The SDT manager of claim 9, wherein the programming further comprises instructions to determine logical links (LLs) between service traffic sources, service traffic sinks, and VF PoPs.

15. The SDT manager of claim 14, wherein the programming further comprises instructions to transmit, in accordance with the determined LLs, to an SDN Controller, instructions to provision the determined LLs by defining physical paths and allocating resources along the defined physical paths, the resources including bandwidth.

16. The SDT manager of claim 9, wherein the instructions to select the PoP for the VF in the VF FG include selecting the PoP in accordance with at least one of network resource requirements associated with the VSF FG, and a match between geographic location of networking resources and a topology associated with the VSF FG.

17. A network controller, comprising:
 an interface; and
 a software defined topology (SDT) component comprising: a non-transitory memory storage comprising instructions; and
 one or more processors in communication with the memory storage, the one or more processors executing the instructions to:
  select a virtual network function (VNF) forwarding graph (FG) template in accordance with a service request from a customer;
  generate a virtual function (VF) forwarding graph (FG) according to the service request, the VNF FG template, traffic information, and network function virtualization (NFV) infrastructure information, the service request comprising a virtual service function (VSF) FG, the VF FG excluding an optional VF in either the VNF FG template or the VSF FG;
  determine a point of presence (PoP) for a VF in the VF FG; and
  determine logical link (LL) information between service traffic sources, service traffic sinks, and VF PoPs according to the VF FG, the service request, the traffic information, and the NFV infrastructure information,
 wherein the interface provides the VF FG, the PoP, and the LL information to a NFV-management and organization (MANO) component and a software defined networking (SDN) traffic engineering (TE) component, and wherein the VF FG comprises recursion of a vertically-recursive VF in either the VSF FG or the VNF FG template, a number of times the vertically-recursive VF appears as a separate function in the VF FG being determined in accordance with the service request and the VNF FG template.

18. The network controller of claim 17, wherein the SDT component is included in the NFV-MANO component.

19. The network controller of claim 17, wherein the SDT component is external to the NFV-MANO component.

20. The network controller of claim 17, wherein the SDT component comprises a first sub-component and a second sub-component, wherein the second sub-component is included within the NFV-MANO component.

21. A network controller, comprising:
an interface; and
a software defined topology (SDT) component comprising:
a non-transitory memory storage comprising instructions; and
one or more processors in communication with the memory storage, the one or more processors executing the instructions to:
generate a virtual function (VF) forwarding graph (FG) according to at least one virtual network function (VNF) FG template, a service request from a customer, traffic information, and network function virtualization (NFV) infrastructure information, the service request comprising a virtual service function (VSF) FG;
determine a point of presence (PoP) for a VF in the VF FG; and
determine logical link (LL) information between service traffic sources, service traffic sinks, and VF PoPs according to the VF FG, the service request, the traffic information, and the NFV infrastructure information, wherein the PoP for the VF in the VF FG is determined through a first iterative feedback process in accordance with the LL information, and wherein the LL information is determined through a second iterative feedback process in accordance with the PoP,
wherein the interface provides the VF FG, the PoP, and the LL information to a NFV-management and organization (MANO) component and a software defined networking (SDN) traffic engineering (TE) component.

22. The network controller of claim 21, wherein the first iterative feedback process and the second iterative feedback process occur in parallel.

23. The network controller of claim 21, wherein the instructions comprise instructions to generate a service-specific network logical topology.

* * * * *